(12) United States Patent
Bretz

(10) Patent No.: US 12,246,872 B2
(45) Date of Patent: Mar. 11, 2025

(54) DEVICE AND METHOD FOR LOADING TRANSPORT CONTAINERS

(71) Applicant: FERAG AG, Hinwil (CH)

(72) Inventor: Markus Bretz, Herrilberg (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 18/204,093

(22) Filed: May 31, 2023

(65) Prior Publication Data

US 2023/0382583 A1 Nov. 30, 2023

(30) Foreign Application Priority Data

| May 31, 2022 | (CH) | 000657/2022 |
| Sep. 2, 2022 | (CH) | 001030/2022 |
| May 22, 2023 | (EP) | 23174649 |
| May 22, 2023 | (EP) | 23174650 |

(51) Int. Cl.

| B65B 35/02 | (2006.01) |
| B65B 5/04 | (2006.01) |
| B65B 25/20 | (2006.01) |
| B65B 43/26 | (2006.01) |
| B65B 43/54 | (2006.01) |
| B65B 61/04 | (2006.01) |

(Continued)

(52) U.S. Cl.
CPC ............. *B65B 43/54* (2013.01); *B65B 5/045* (2013.01); *B65B 25/20* (2013.01); *B65B 35/02* (2013.01); *B65B 43/26* (2013.01); *B65B 61/04* (2013.01); *B65B 61/06* (2013.01); *B65G 67/20* (2013.01)

(58) Field of Classification Search
USPC .......................................................... 53/435
See application file for complete search history.

(56) References Cited

U.S. PATENT DOCUMENTS

| 3,063,570 A | 11/1962 | Kroner |
| 3,703,841 A | 11/1972 | Crawford |
| 4,146,150 A | 3/1979 | Low et al. |

(Continued)

FOREIGN PATENT DOCUMENTS

| CH | 536 222 A | 4/1973 |
| CH | 693 710 A5 | 12/2003 |

(Continued)

OTHER PUBLICATIONS

Swiss Federal Institute of Intellectual Property, Bern, Switzerland, Swiss Search Report for CH01030/22, dated Dec. 19, 2022, in the German Language (2 pp.).

(Continued)

*Primary Examiner* — Chinyere J Rushing-Tucker
(74) *Attorney, Agent, or Firm* — Pauley Erickson & Swanson

(57) ABSTRACT

A device (6) for the insertion of flat good units (2, 3, 31) into a transport container (8, 81) includes an insertion module (63) for the insertion of flat good units (2, 3, 31) into a transport container (8, 81), a feed module (61) for feeding flat good units (2, 3, 31) to the insertion module (63), and a first identification module (65) for identifying flat good units (2, 3, 31). The feed module (61) includes a horizontal conveying device (613), by which flat good units can be conveyed along a conveying path. The identification module (65) is configured to determine the identity of a flat good unit.

17 Claims, 17 Drawing Sheets

(51) Int. Cl.
*B65B 61/06* (2006.01)
*B65G 67/20* (2006.01)

(56) References Cited

U.S. PATENT DOCUMENTS

| | | | |
|---|---|---|---|
| 5,611,430 | A | 3/1997 | Albrecht et al. |
| 6,107,921 | A | 8/2000 | Eberhardt et al. |
| 7,683,283 | B2 * | 3/2010 | Hanson ............ B65H 31/3009 |
| | | | 700/223 |
| 9,483,672 | B2 | 11/2016 | Pantaloni |
| 10,773,839 | B1 | 9/2020 | Talda et al. |
| 2010/0254633 | A1 | 10/2010 | Andochick |
| 2012/0019364 | A1 | 1/2012 | Reichenbach et al. |
| 2015/0324621 | A1 | 11/2015 | Reichenbach et al. |
| 2017/0275826 | A1 | 9/2017 | Fenile et al. |
| 2017/0282317 | A1 | 10/2017 | Guhl |
| 2017/0369250 | A1 | 12/2017 | Fenile et al. |
| 2018/0004992 | A1 | 1/2018 | Jacobsen |
| 2018/0072511 | A1 | 3/2018 | Fenile |
| 2018/0208407 | A1 | 7/2018 | Ruge et al. |
| 2018/0215547 | A1 | 8/2018 | Fenile et al. |
| 2019/0367277 | A1 * | 12/2019 | Sigrist .................... B65G 43/08 |
| 2019/0367282 | A1 | 12/2019 | Stauber |
| 2020/0062515 | A1 * | 2/2020 | Ramseier .............. B65G 47/61 |
| 2021/0009351 | A1 | 1/2021 | Beinhofer et al. |
| 2021/0053763 | A1 | 2/2021 | Fenile et al. |
| 2021/0171292 | A1 | 6/2021 | Fenile et al. |
| 2021/0395017 | A1 | 12/2021 | Stauber |
| 2023/0002096 | A1 * | 1/2023 | Talda .................... B65B 59/02 |
| 2023/0382582 | A1 | 11/2023 | Bretz |

FOREIGN PATENT DOCUMENTS

| | | |
|---|---|---|
| DE | 198 42 586 A1 | 3/2000 |
| DE | 10 2005 027313 A1 | 12/2006 |
| DE | 10 2010 020 531 A1 | 11/2011 |
| EP | 1 642 836 A1 | 4/2006 |
| EP | 2 130 968 A1 | 12/2009 |
| EP | 2 161 214 A1 | 3/2010 |
| EP | 2 196 415 A2 | 6/2010 |
| EP | 2 418 160 A1 | 2/2012 |
| EP | 3 808 530 A1 | 4/2021 |
| JP | S48-51784 A | 7/1973 |
| JP | S53-63180 U | 5/1978 |
| JP | 4344851 B2 | 10/2009 |
| WO | WO 2004/000198 A1 | 12/2003 |
| WO | WO 2015/124524 A1 | 8/2015 |
| WO | WO 2017/088077 A1 | 6/2017 |
| WO | WO 2018/078098 A1 | 5/2018 |
| WO | WO 2018162123 A1 | 9/2018 |
| WO | WO 2019/028485 A1 | 2/2019 |
| WO | WO 2020/146503 A1 | 7/2020 |
| WO | WO 2020/146603 A1 | 7/2020 |

OTHER PUBLICATIONS

Swiss Federal Institute of Intellectual Property, Bern, Switzerland, Swiss Search Report for CH00657/22, dated Dec. 5, 2022, in the German Language (2 pp.).

EPO, München, Germany, European Notice (EPA Form 1507N) and Search Report (EPO Form 1503 03 82) for European Patent Application No. EP 23 17 4649.6, Oct. 19, 2023 (9 pp.).

EPO, München, Germany, "European Notice (EPA Form 1507N) and Search Report (EPO Form 1503 03 82)," for European Patent Application No. EP 23 17 4650.4, Mar. 14, 2024 (12 pp.).

* cited by examiner

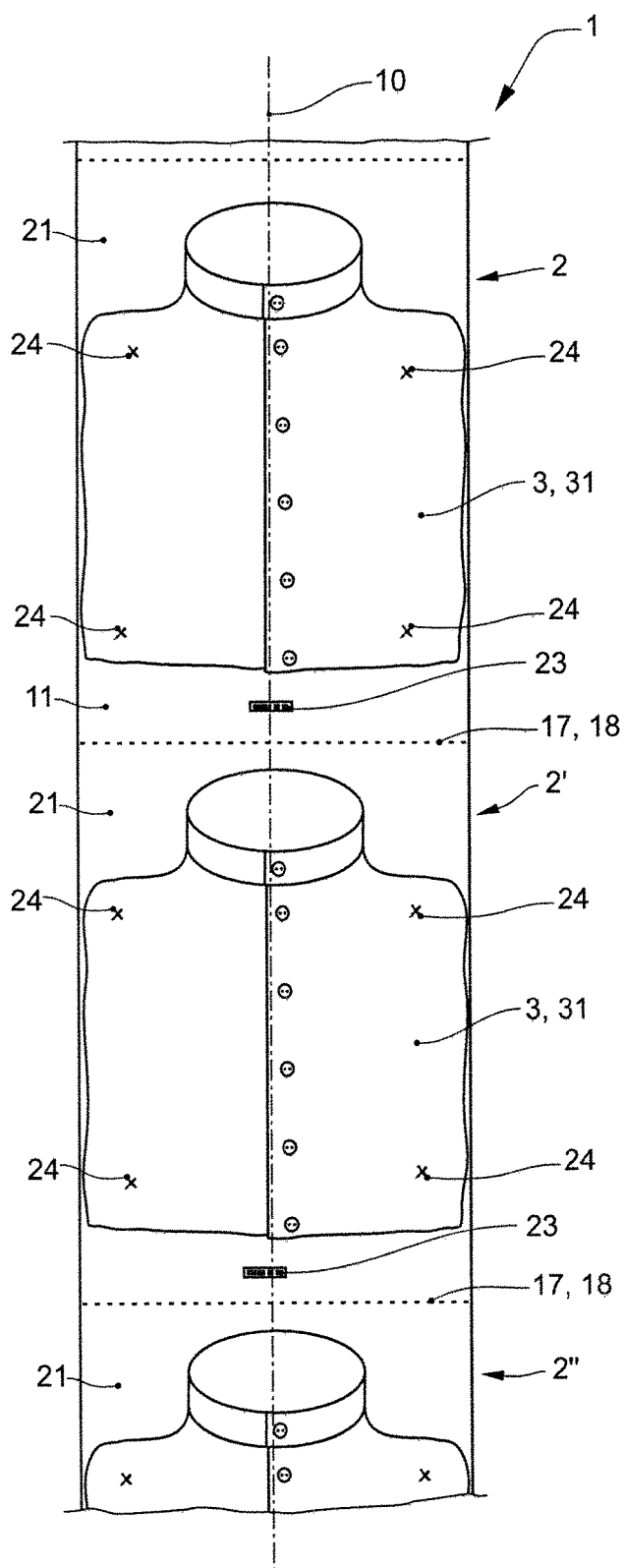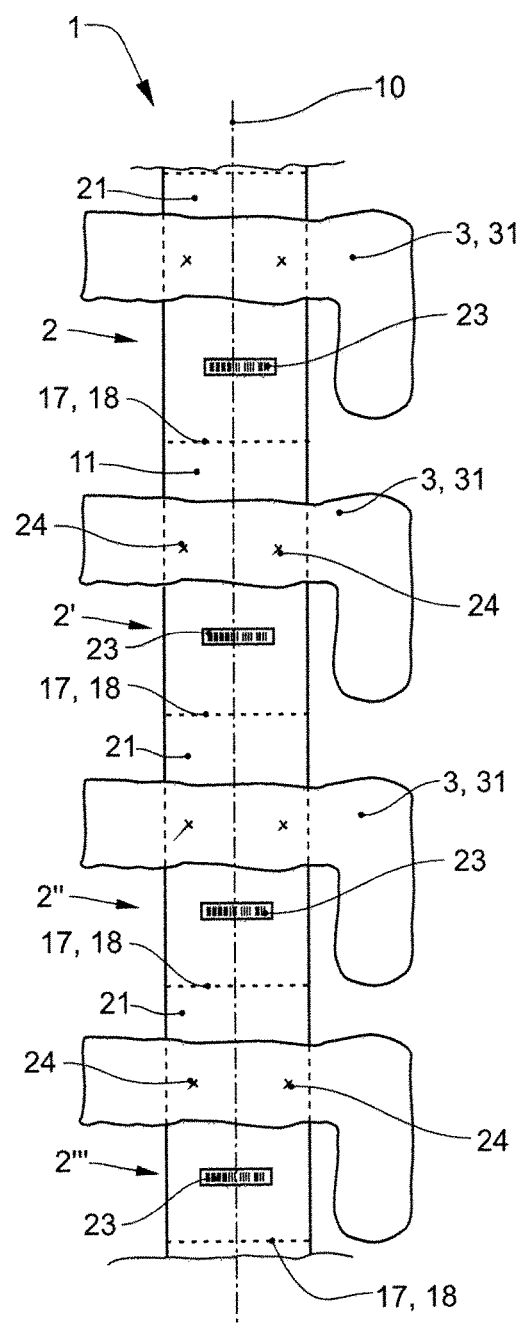
Fig. 1
Fig. 2

DEVICE AND METHOD FOR LOADING TRANSPORT CONTAINERS

CROSS REFERENCE TO RELATED APPLICATIONS

This patent application is a continuation each of U.S. patent application Ser. No. 18/203,985, filed 31 May 2023 and U.S. patent application Ser. No. 18/204,093, filed 31 May 2023, each of which claim priority to Swiss Patent Application No. CH000657/2022, filed May 31, 2022; Swiss Patent Application No. CH001030/2022, filed Sep. 2, 2022; European Patent Application No. 23174649.6, filed May 22, 2023, and European Patent Application No. 23174650.4, filed May 22, 2023. The aforementioned priority documents, corresponding to this invention, to which a foreign priority benefit is claimed under Title 35, United States Code, Section 119, and Title 37, United States Code, Section 1.55, and their entire teachings are incorporated, by reference, into this specification.

All the above-referenced applications are hereby incorporated by reference herein in their entirety and are made a part hereof, including but not limited to those portions which specifically appear hereinafter.

BACKGROUND OF THE INVENTION

Field of the Invention

The invention relates to devices and methods for inserting flat good units into a transport container.

Discussion of Related Art

Important topics of intralogistics are, among other things, the provision of goods units and the picking of goods units, i.e., the assembly of different goods units for an order. In this case, there is a need for automation of operations in intralogistics systems.

Conveyor systems having automatically conveyable transport containers have become established in particular with regard to heterogeneous goods units as an efficient solution for automatic storage systems and picking systems. In automated warehouses, spacious production facilities, and generally in the conveying and transport of goods, overhead conveyor systems have proven to be an efficient means of transport, intermediate buffering, but also long-term storage of various types of goods.

In overhead conveyor systems, also known as suspended conveyor systems, the goods are either suspended in a suitable manner directly from individual conveyor members of a conveyor system, or inserted into corresponding transport containers such as transport bags, which in turn are mounted in a suspended manner on the conveyor members. Overhead conveyor systems can be implemented as transport chain installations, in which a large number of conveyor members form links of a chain that is moved along a conveying path. Gravity conveyor systems are also known, in which individual conveyor members move on corresponding running rails. Such gravity-conveyed, rail-guided conveyor systems are known for example from US 2017/275826 A1, US 2018/215547 A1 and US 2017/282317 A1.

US 2021/0395017 A1 in particular shows a device for automatically providing overhead conveyor bags in a configuration in which the overhead conveyor bags can be filled transversely to the conveying direction.

In particular the constantly increasing volumes in online trading require retailers, suppliers and logistics companies to handle the goods to be processed efficiently, in particular in relation to the production, provision and storage of the articles, as well as the commissioning and transport of the articles to the customer. Overhead conveyor systems having transport containers are particularly suitable for efficiently conveying heterogeneous units of goods, such as workpieces in production processes, spare parts, consumer goods like books, clothes, shoes, etc. In logistics centers of mail order companies, for example, overhead conveyor systems can be used to store a large number of units of goods of different sizes and weights, and to pick groups of articles according to the respective customer orders, i.e., to combine them into groups of goods according to specifications, and to provide them for dispatch.

In this description, the terms "unit of goods" or "goods unit" or "goods" are used synonymously and may comprise in particular single piece of goods, but also packaged goods such as packages, and in general individually handleable objects.

A relevant aspect for an overhead conveyor system is the simple, smooth and efficient insertion of units of goods into the empty transport members, for example transport bags, and the simple, smooth and efficient removal of the units of goods from the transport members. In this case, manual insertion of the units of goods into the transport members or removal of the units of goods from the transport members allows a flexible handling of different units of goods, but is slow and cost-intensive. Partially or fully automated systems were developed accordingly.

Examples of such automated loading systems and/or unloading systems for transport bags transported in an overhead conveyor system are shown, for example, in EP 2130968 A1, US 2018/072511 A1, US 2018/0208407 A1, EP 2418160 A1, US 2019/0367282 A1, US 2021/0171292 A1, WO 2018/078098 A1, US 2017/0369250 A1 and US 2021/0053763 A1.

In order that transport containers can be filled with goods units efficiently and without disruption, the goods units should have a stable geometry. In the case of goods having poor dimensionally stability, such as clothing items, this can be achieved, for example, by packaging them in a plastic film. The use of such plastic packaging is, however, increasingly criticized, on the one hand due to the consumption of valuable resources, and on the other hand due to environmental pollution in the case of unsuitable disposal of the packaging material.

The filling of transport containers with goods units generally has at least one manual work step, namely during the separation of the goods units. Goods units are removed manually from a stack or from a container and individually inserted either directly into provided transport containers or into a corresponding filling device. The use of robot systems is possible, but is less cost-efficient for this purpose.

In order to enable the identification of objects, in particular goods units, in an intralogistics system, the goods units can be provided with readable data elements which contain the type of goods or a unique identification number. For example, optically readable data elements in the form of barcodes or two-dimensional QR codes can be attached to an object, which can then be read out using a barcode scanner or a camera.

RFID (Radio Frequency Identification) transponders can also be arranged on or in the goods units. Such RFID elements are read out using a radio-frequency-based RFID reader device. RFID elements, can be designed to be active or passive. RFID elements are known, in which data can be written from the outside. Passive RFID transponders, also called RFID tags, are supplied with energy by a radio frequency signal radiated from the outside. These are cost-effective and maintenance-free.

Depending on the technology used, RFID transponders can also be read out at a greater distance, which, in the case of spatial proximity of a plurality of corresponding objects, can impede the unambiguous assignment of a received signal, and thus of the associated data, to a specific object.

DE 102010020531 A1 discloses an RFID reader device by means of which an RFID element of an object can be read out, which is conveyed past a laterally arranged RFID reader unit on a horizontal conveyor. The transmitting antenna has a directional characteristic having a pivotable directional region. The Signal intensity is used to determine whether a received signal originates from an object at the intended detection position, or another position on the horizontal conveyor.

US 2012/0019364 A1 shows another RFID reader unit for reading objects on a conveyor, having a readout tunnel through which a horizontal conveyor runs.

US 2015/0324621 A1 shows an RFID reader having a readout tunnel and having an additional hand antenna for the post-identification of objects on a conveyor, which is connected to the stationary RFID reader unit.

U.S. Pat. No. 9,483,672 B2 shows a roller conveyor having an RFID reader unit which is arranged below the roller conveyor. The rollers of the roller conveyor are not driven. The RF (radio frequency) transmitter of the RFID reader unit comprises an excitation exciter, which is arranged below two rollers of the roller conveyor, above a base plate. The metal shafts of the two rollers are electrically connected to form a closed loop. This results in an upwardly directed localized RF field which can excite a passive RFID element on an object on the roller conveyor. The roller conveyor and the RFID reader unit form an integral unit, the components of which must be matched with one another.

There is a general need for improvement in this field of technology.

SUMMARY OF THE INVENTION

The object of the invention is to provide a bundle of the type mentioned at the outset, which does not have some of the aforementioned and other disadvantages. In particular, such a bundle is intended to enable goods units to be efficiently inserted into transport containers of a conveyor system of an intralogistics system. Such a bundle should advantageously be inexpensive to produce, and it is intended to require little or no manual work steps in handling.

Another object of the invention is to provide a device and a method for inserting goods units into a transport container. Such a device or such a method should enable a cost-efficient automatic filling of transport containers with goods units.

These and other objects are achieved by a bundle according to the invention, a method according to the invention for producing bundles, and devices according to the invention and methods for inserting goods units into transport containers, according to the independent claims. Further advantageous embodiments and variants are also specified in the dependent claims and the description.

The solution according to the invention can be further improved by various embodiments which are advantageous in themselves and, unless stated otherwise, can be combined with one other as desired. These embodiments and the advantages associated with them are discussed below.

A first aspect of the invention relates to an advantageous bundle for a plurality of goods units. Such an advantageous bundle comprises a carrier strand on which a plurality of packaging units is arranged in series one behind the other.

Such a bundle allows for the packaging units to be conveyed in a controlled manner in the longitudinal direction by conveying the carrier strand and, if necessary, to be provided for further processing without prior separation of the packaging units being necessary. If necessary, a single packaging unit, or also a plurality of packaging units arranged one behind the other, can then be separated from the bundle according to the invention, so that they can be processed further. In particular, the packaging unit can be inserted into a transport container provided.

The carrier strand and/or the packaging unit can be made of plastics material, in particular of a degradable plastics material or a recycled plastics material. Alternatively, carrier strand and/or packaging unit can be produced from paper or cardboard or biological fiber material.

In a bundle according to the invention, at least one goods unit is advantageously arranged in at least one packaging unit of the plurality of packaging units.

The goods units in a packaging unit of such a bundle according to the invention can in particular be dimensionally stable. The goods units can be, for example, garments.

A bundle according to the invention can comprise various types of goods units, for example garments of different sizes and/or different colors.

Alternatively, a bundle according to the invention can also be provided without goods units, in order to be able to insert the goods units into the packaging units at a later point in time.

In a bundle according to the invention, the carrier strand is advantageously band-shaped.

Alternatively, or additionally, the carrier strand is advantageously made of a flexible material in the case of a bundle according to the invention.

In an advantageous embodiment of a bundle according to the invention, in the case of the carrier strand a hinge element is arranged between two adjacent packaging units.

Such hinge elements serve to be able to fold together the carrier strand of a bundle according to the invention in a targeted manner, for example in the manner of a fanfold, which enables a space-saving packaging of such a bundle. In addition, such a bundle according to the invention is flexible, which facilitates automatic conveying.

Alternatively, or additionally, in the case of a bundle according to the invention, a predetermined breaking point or a locally delimited mechanical weak point can be arranged between two adjacent packaging units, in the carrier strand.

A predetermined breaking point simplifies the separation of packaging elements from the bundle, in that the corresponding predetermined breaking points are used to separate a piece of the carrier strand having the packaging unit arranged thereon. A plurality of packaging units arranged one behind the other can also be separated.

A locally limited mechanical weak point can also assume the function of a hinge element.

In a further advantageous embodiment, a bundle according to the invention comprises two or more carrier strands which are arranged in parallel with one another.

Such a configuration of a bundle has the advantage that less material is required than if a carrier strand extends over the entire width between the outermost two carrier strands.

In another advantageous embodiment of a bundle according to the invention, the carrier strand is formed by packaging units connected to one another in a chain-like manner.

Such a bundle has the advantage that no separate carrier strand is required for obtaining a packaging strand.

In a further advantageous embodiment of a bundle according to the invention, the packaging units have a substantially flat first carrier element, on which a goods unit can be fastened or is fastened.

In yet another advantageous embodiment of a bundle according to the invention, the packaging units have two substantially flat carrier elements, between which a goods unit can be or is held in a form-fitting manner.

Advantageously, at least one machine-readable first data element is arranged on the carrier strand, which is logically assigned to the entire bundle or a subset of the packaging units of the bundle.

Such a first data element makes it possible, for example, to obtain a device which processes a bundle by reading out, from the data element, information about the bundle, its packaging units and or the goods units contained therein, so that when a goods unit is inserted into a transport container the identity of the goods unit can be assigned to the corresponding transport container in a database. For example, the type and number of the goods units can be contained in the data element, so that this information does not have to be manually acquired by an operator. This reduces the workload and eliminates possible error sources. It is also possible, for example, for different goods units to be arranged in the same bundle. Thus, for example, a set of different sizes and/or colors, of a specific type of clothing, can be supplied in the same bundle.

A first data element can also contain data which facilitate the correct processing of the bundle. For example, data relating to dimensions and material properties of the individual components of the bundle can be provided. Such details make it possible to accordingly adapt devices which are intended to process different types of bundles.

Alternatively, or additionally, in the case of a bundle according to the invention, machine-readable second data elements can be arranged on the individual packaging units.

The second data elements are logically assigned to the corresponding packaging unit and can be attached to the actual packaging unit or also to the goods unit contained therein.

Alternatively, or additionally, in the case of a bundle according to the invention, a plurality of machine-readable second data elements can be arranged on the carrier strand, one of these second data elements being logically assigned to one packaging unit in each case.

Such second data elements for example can contain information about the goods units which are contained in the corresponding packaging units of the bundle. This can serve, in combination with a first data element, for double control. Furthermore, the sequence of the goods units along the carrier strand can be configured more flexibly since the identification of each goods unit can take place individually.

The first data elements or second data elements of such a bundle according to the invention can have a one-dimensional barcode, a two-dimensional barcode, a text element, a graphics element, and/or an RFID element.

In another advantageous embodiment of a bundle according to the invention, the carrier strand has machine-readable markings for determining the position on the carrier strand.

Such position markings make it possible to ensure the correct orientation of processing devices, for example of modules for separating packaging units from the bundle.

Likewise, in this way, individual packaging units or goods units can be identified, in conjunction with data relating to the type and position of goods units on the carrier strand, as can be provided for example in a first data element, without the corresponding packaging units having individual identification data.

In another advantageous embodiment of a bundle according to the invention, the carrier strand has active elements which can interact with conveying modules. The active elements can be designed, for example, as guide holes or lateral notches along the carrier strand.

Such active elements allow the form-fitting interaction of a conveying module with the carrier strand, which allows more precise conveying than, for example, in the case of a force-fitting conveying of the carrier strand.

Advantageously, in the case of a bundle according to the invention, a start element is arranged at a first end of the carrier strand.

Such a start element can for example serve to correctly insert the carrier strand into a processing device. A first data element is advantageously arranged on the start element.

In a container bundle to the invention, a termination element is advantageously arranged at a second end of the carrier strand.

Such a termination element offers the advantage, for example, that it is possible to detect when the regular end of the carrier strand of the bundle is reached. Thus, for example, a premature reaching of an end of the carrier strand can be detected, for example if the latter is previously torn.

In yet another advantageous variant of a bundle according to the invention, the bundle is arranged in a container.

Such a container can be, for example, a box or a packaging box which allows easy transport and simple storage of the bundle.

A second aspect of the invention relates to an advantageous method for producing a bundle from a plurality of goods units. Such an advantageously method comprises the steps of:

providing a carrier strand;
providing a plurality of packaging units;
inserting goods units into the packaging units; and
attaching the plurality of packaging units along the carrier strand.

A bundle according to the invention is advantageously produced at the location of the production of the goods units.

In an advantageous variant of a method according to the invention, the packaging units are formed from the carrier strand. Such a method has the advantage that a separate carrier strand can be dispensed with.

In another advantageous variant of the method according to the invention, the packaging units are attached to the carrier strand.

In a further advantageous variant of the method according to the invention, the carrier strand is formed by arranging the packaging units one after the other in a row.

In yet another advantageous variant of the method according to the invention, the carrier strand is formed by concatenating the packaging units.

In a method according to the invention, the goods units are advantageously inserted into the packaging units, along the carrier strand, after the packaging units have been attached.

In a method according to the invention, the goods units are advantageously inserted into the packaging units, along the carrier strand, before the packaging units are attached.

The goods units can also be inserted into the packaging units, on the carrier strand, only after the packaging units have been attached. This can take place, for example, substantially directly after the attachment of the packaging units. Alternatively, the bundle can be produced completely without goods units and can be provided for later filling of the packaging units with goods units.

A third aspect of the invention relates to an advantageous device for inserting goods units into a transport container. Such an advantageous device comprises a module for feeding a bundle according to the invention or a bundle produced according to a method according to the invention; a module for separating packaging elements from a fed bundle; and a module for inserting packaging units, separated from the bundle, into a transport container.

Advantageously, such a device according to the invention has a module for identifying bundles and/or packaging units and/or goods units.

The term "identification" is used in connection with this description both for the identification of a specific individual object, for example a unique identification number, and also for the identification of a type of a specific object, for example an article number.

Such an identification module can comprise a reader unit which is provided to read a data element of a bundle or a packaging unit of the bundle. An identification module can also have an evaluation unit which is provided to evaluate the data read in and to use these data for identifying a bundle or a packaging unit.

A device according to the invention advantageously comprises a module for providing transport containers.

For example, such a module for providing transport containers can be integrated into a conveyor system of an intralogistics system. It can be configured in such a way that transport containers can be supplied in the conveying system, prepared for filling, and subsequently conveyed away again in the conveying system.

In a device according to the invention, the module for providing transport containers is advantageously configured to receive a transport container from a conveyor system and/or to transfer a transport container to a conveyor system.

The conveyor system can in particular be an overhead conveyor system. The transport container can in particular be an overhead conveyor bag.

Advantageously, in a device according to the invention, the module for providing transport containers is designed to receive a transport container in the form of an overhead conveyor bag from an overhead conveyor system, and/or to transfer it to the overhead conveyor system.

In a further advantageous embodiment of a device according to the invention, the module for providing transport containers is designed to transfer a transport container, in the form of an overhead conveyor bag, from a closed state into an open state.

In another advantageous embodiment of a device according to the invention, the module for providing transport containers is designed to align a transport container, in the form of an overhead conveyor bag of an overhead conveyor system, before the goods unit is inserted.

In such a device according to the invention, the module for providing transport containers is particularly advantageously configured to rotate the overhead conveyor bag from a conveying position into a filling position before the goods unit is inserted.

A device according to the invention for inserting goods units into a transport container is advantageously integrated into a conveyor system of an intralogistics system.

A fourth aspect of the invention relates to a method for inserting goods units into a transport container. Such a method according to the invention comprises the steps of:
    providing a bundle according to the invention or a bundle produced according to a method according to the invention;
    providing a transport container;
    separating at least one packaging unit, which contains at least one goods unit, from the bundle; and
    inserting the at least one separated packaging unit into the transport container.

In such a method according to the invention, the packaging units of the row are advantageously separated from the bundle in sequence, along the carrier strand.

Alternatively, or additionally, in such a method according to the invention, the packaging units can be separated from the bundle and inserted into the transport container in groups of two or more packaging units.

In a method according to the invention, the provided transport container is advantageously a transport container of a conveying system, for example an overhead conveyor bag of an overhead conveyor system.

In an advantageous variant of a method according to the invention for inserting goods units into a transport container, in order to insert the at least one separated packaging unit into a transport container said transport container is stopped in the conveying system and the at least one packaging unit is subsequently inserted into the transport container.

In another advantageous variant of a method according to the invention for inserting goods units into a transport container, in order to insert the at least one separated packaging unit into a transport container, said transport container is continuously conveyed in the conveying system, and the at least one packaging unit is inserted into the moving transport container.

Continuous filling has the advantage that higher cycle times can be achieved due to the omitted braking and acceleration processes. A device for automatically filling overhead conveyor bags, while they are conveyed continuously, is known, for example, from US 2018/0208407 A1.

In a method according to the invention, the transport container in the form of an overhead conveyor bag of an overhead conveyor system is advantageously transferred from a closed state into an open state before the goods unit is inserted.

In a method according to the invention, again advantageously the transport container in the form of an overhead conveyor bag of an overhead conveyor system is aligned before the goods unit is inserted.

Particularly advantageously, in this case, the overhead conveyor bag is rotated from a conveying position into a filling position before the goods unit is inserted.

A fifth aspect of the invention relates to a device for inserting flat good units into a transport container. Such a device according to the invention comprises an insertion module for inserting flat good unit into a transport container; a feed module for feeding flat good unit to the insertion module; and a first identification module for identifying flat good units. The feed module comprises a horizontal conveying device, by means of which flat good units can be conveyed along a conveying path. The identification module is configured to determine the identity of a flat good unit.

The feed module can be designed as a horizontal conveying device, for example as a belt conveyor.

The first identification module is advantageously designed to read out a data element of the flat good unit.

The identification module is further advantageously designed to determine the shape and dimensions of the flat good unit.

A flat good unit is understood to mean an object that is suitable for being transported horizontally, in a lying position. A flat good unit can be, for example, an in particular packaged or unpackaged individual product, an item of clothing, or a packaging unit separated from a bundle according to the invention.

A transport container can in particular be an overhead conveyor bag of an overhead conveyor system.

An overhead conveyor bag of an overhead conveyor system advantageously comprises a carriage which can be conveyed in a sliding or rolling manner on a running rail of the overhead conveyor system, as well as a transport bag which is mounted suspended on the carriage by means of a suitable suspension device and in which goods units can be stored.

Particularly advantageously, a transport container has a readable data element which allows identification of the transport container. Such a readable data element can in particular be an optically readable data element or an RFID element.

If the transport container is designed as an overhead conveyor bag of an overhead conveyor system, the data element can be attached to the carriage of the overhead conveyor bag and/or attached to the transport bag of the overhead conveyor bag so as to be suspended thereon.

In a device according to the invention, the identification module is advantageously configured to determine the identity of a flat good unit when the latter is located on the horizontal conveying device at an identification position.

Such a selective identification of a flat good unit makes it possible to increase the temporal or spatial sequence of flat good units on the feed module, without the possibility of ambiguous identifications.

Advantageously, the first identification module comprises an optical reader unit and/or an RFID reader unit.

An optical reader unit can in particular comprise a camera or a barcode scanner in order to read out an optically readable data element such as a barcode or a QR code, which contains the information for identifying the goods unit.

An optically readable data element must naturally be arranged on the outer side of a goods unit or in another manner visible from the outside so that the identification data can be read out. Since it is not absolutely possible to control how a goods unit is arranged on the feed module, it may be necessary to provide an object with multiple optically readable data elements.

RFID elements have the advantage that they can also be arranged within a goods unit.

An RFID reader unit of the identification module is particularly advantageously arranged below the feed module.

An arrangement of the RFID reader unit below the feed module allows for processing of flat good unit of different sizes. If, on the other hand, the RFID reader unit is arranged above the feed module, the distance to the feed module must be sufficient to allow the largest provided goods unit to pass through. However, in the case of a lateral arrangement of the RFID reader unit, the distance to the goods unit or to an RFID transponder arranged on the goods unit is not defined.

Furthermore, an arrangement of the RFID reader unit below the feed module has the advantage that the distance to an RFID transponder is as small as possible. This allows the use of UHF RFID transponders which can be read at a shorter distance, which reduces the necessary minimum distance between successive goods units.

In another advantageous embodiment of a device according to the invention, the feed module comprises a belt conveyor having an upper belt plane and a lower belt plane. An RF transmitter and/or an RF receiver of an RFID reader unit of the identification module is arranged between the upper belt plane and the lower belt plane of the belt conveyor.

In this way, the RF transmitter and/or the RF receiver of the RFID reader unit can be brought to a minimum distance from the goods unit of the belt conveyor, which is substantially given only by the thickness of the belt of the belt conveyor.

Advantageously, the belt of the belt conveyor has no metal or conductive components, in order that the influence on the RFID reader unit is minimal.

In a further advantageous embodiment of a device according to the invention, the first identification module has a light barrier device for determining the presence or position of an object, in particular a flat good unit, on the feed module.

In combination with the conveying speed of a feed module, such a light barrier device makes it possible to know the position and length of a goods unit on the feed module. In this way, the goods unit can be positioned at the ideal identification position of the identification module.

In yet another advantageous embodiment of a device according to the invention, the device is connected by a control device to a database, and the control device is configured to logically link, in the database, the identity of a filling transport container to be filled and the identity of the flat good unit inserted therein.

This logical linking of the goods unit and transport container is referred to in intralogistics as a marriage of the goods unit and transport container.

Yet another advantageous embodiment of a device according to the invention has a module for providing transport containers.

Advantageously, the module for providing transport containers of such a device according to the invention has a second identification module for identifying transport containers.

The second identification module can read out data elements of the transport container which allow identification of the transport container.

Particularly advantageously, the second identification module comprises an optical detector unit and/or an RFID reader unit.

An optical reader unit can in particular comprise a camera or a barcode scanner, in order to read out an optically readable data element such as a barcode or a QR code.

In a device according to the invention, the module for providing transport containers is advantageously configured to receive a transport container from a conveyor system and/or to transfer a transport container to a conveyor system.

In a device according to the invention, the module for providing transport containers is advantageously configured to transfer a transport container in the form of an overhead conveyor bag from a closed state into an open state.

In a device according to the invention, the module for providing transport containers is advantageously configured to align a transport container, in the form of an overhead conveyor bag of an overhead conveyor system, before the goods unit is inserted.

In a device according to the invention, the module for providing transport containers is advantageously configured to rotate the overhead conveyor bag from a conveying position into a filling position before the goods unit is inserted.

In another advantageous variant of a device according to the invention, the device comprises a feed module for supplying a bundle, with a carrier strand on which a plurality of packaging units is arranged one behind the other in series; and a separation module for providing flat good units by separating package elements from a supplied bundle.

Advantageously, a device according to the invention is integrated into a conveyor system of an intralogistics system.

A sixth aspect of the invention relates to a method for inserting flat good units into a transport container. In such a method according to the invention, a flat good unit is provided on a feed module;
a transport container is provided;
the flat good unit is identified;
the transport container is identified; and
the flat good unit is inserted into the transport container.

A flat good unit is understood to mean an object that is suitable for being transported horizontally, in a lying position. A flat good unit can be, for example, an in particular packaged or unpackaged individual product, an item of clothing, or a packaging unit separated from a bundle according to the invention.

A transport container can in particular be an overhead conveyor bag of an overhead conveyor system.

An overhead conveyor bag of an overhead conveyor system advantageously comprises a carriage which can be conveyed in a sliding or rolling manner on a running rail of the overhead conveyor system, as well as a transport bag which is mounted suspended on the carriage by means of a suitable suspension device and in which goods units can be stored.

Particularly advantageously, a transport container has a readable data element which allows identification of the transport container. Such a readable data element can in particular be an optically readable data element or an RFID element.

If the transport container is designed as an overhead conveyor bag of an overhead conveyor system, the data element can be attached to the carriage of the overhead conveyor bag and/or attached to the transport bag of the overhead conveyor bag so as to be suspended thereon.

In such a method according to the invention, the identity of the flat good unit and the identity of the transport container are advantageously linked to one another logically.

Such a logical link advantageously takes place in a database, for example a database of a control device of an intralogistics system.

Further aspects of the present invention also emerge from the following description.

BRIEF DESCRIPTION OF SEVERAL VIEWS OF THE DRAWINGS

For improved understanding of the present invention, reference is made below to the drawings. These only show embodiments of the subject matter of the invention and are not suitable for limiting the invention to the features disclosed herein. The same or similar reference signs are used in the following figures and the corresponding description for identical or similar elements.

FIG. 1 shows a schematic plan view of an embodiment of a bundle according to the invention;

FIG. 2 shows a schematic plan view of another embodiment of a bundle according to the invention;

DETAILED DESCRIPTION OF THE INVENTION

A possible embodiment of a bundle 1 according to the invention is shown in FIG. 1. The bundle 1 comprises a carrier strand 11 in the form of a flat strip or band which defines a longitudinal direction 10. The carrier strand 11 is made of a material which has a certain mechanical stability. In this case, the mechanical stability must be sufficient to ensure that a packaging unit 2, 2', 2" separated from the carrier strand 11 can stand perpendicularly on a longitudinal edge or transverse edge, without the packaging unit folding or collapsing under the own weight of the packaging unit and the goods unit arranged therein.

In the example shown, for example, thin cardboard can be selected as the material for the carrier strand 11, which material is provided for example as a continuous web from a roll. Alternatively, another suitable material can also be selected, such as a plastics film having suitable stiffness, in such a case a biodegradable material advantageously being selected.

Figure 13:
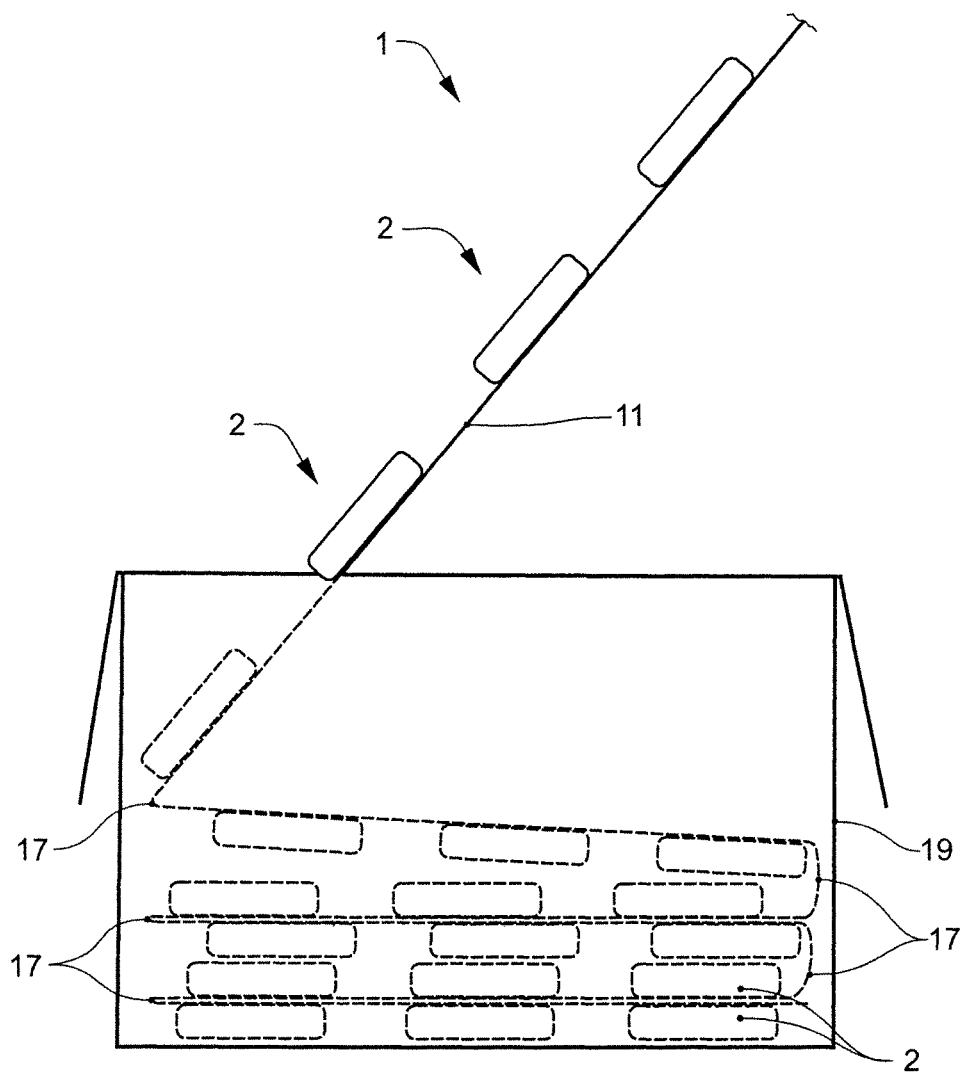
FIG. 13 shows a schematic cross section of a bundle according to the invention in a container.

The carrier strand 11 has perforations 17 transversely to the longitudinal direction 10 at regular intervals. These perforations divide the carrier strand 11 functionally into a plurality of packaging units 2, 2', 2", each having a flat carrier element 21. At the same time, local weaknesses of the mechanical stability of the carrier strand are formed along the perforations 17. The perforations therefore act as hinge elements, at which adjacent carrier elements 21 of the carrier strand 11 are pivotable relative to one another. This makes it possible for the bundle 1 to be able to be flexibly deflected perpendicularly to the longitudinal direction 10 and to the perforation 17, analogously to a chain. In this way it can for example be conveyed using a suitable device, as will be discussed below in conjunction with FIG. 18. It can also be accommodated in a space-saving manner in a container, as shown in FIG. 13.

The perforations can additionally also be used as predetermined breaking points 18 in order to separate a packaging unit 2 from the remaining bundle 1, as required. Such isolated packaging units 2, 2', 2" can then be inserted, for example, into a transport container of a conveying system without the goods unit being damaged or impaired in quality. For example, such a packaging unit can be inserted into an overhead conveyor bag of an overhead conveyor system.

A goods unit 3 in the form of a shirt 31 folded flat in a conventional form is arranged on each packaging unit 2, 2', 2". The goods units 3, 31 are connected to the carrier element 21 of the packaging unit 2, 2', 2" at four fastening points 24. For example, the shirt can be sewn onto the four fastening points 24 by a thread, or be attached to the packaging unit by means of a pin, or connected thereto in some other form-fitting manner.

It is also possible to use correspondingly suitable clamping elements which clamp the shirt 31 and the carrier element 21 of the packaging unit 2 together in a force-fitting manner via lateral edges, for example.

The stiffness of the entire combination of the packaging unit 2 and the goods unit 3 also contributes to the effective mechanical stability of the packaging unit. For a goods unit which already has a certain mechanical stability, the material of the carrier strand 11 can thus be selected to be thinner, for example.

In the example shown, in addition to the resulting mechanical stability of the packaging unit, the packaging unit 2 additionally has the effect that the edges of the goods units are protected during conveying and storage of isolated packaging units.

In the embodiment shown, data elements 23 in the form of optically readable barcodes are arranged on the carrier elements 21 of the packaging units. Alternatively, other data elements can also be used, such as two-dimensional QR codes or RFID elements. The data elements 23 can contain, for example, information on the type of the goods unit 3 contained in the packaging unit 2, data on the production sequence, such as batch number, date of production and production location, an individual identification number, or a reference to an entry in a database.

The data element 23 can, for example, be attached to the packaging unit 2 when the goods unit 3 is inserted. Alternatively, the data element 23 can be attached to the carrier element 21 independently of the goods unit 3, and later described with data in the production sequence. Corresponding data can also be assigned to a unique identification number in a database.

Another advantageous embodiment of a bundle 1 according to the invention is shown in FIG. 2. The carrier strand 11 is in turn designed in the so as to be band-shaped or strip-shaped, and is divided by perforating strips 17 into individual packaging units 2, 2', 2", 2''' having flat support elements 21. A goods unit 3 in the form of a pair of socks 31 is attached to each of the carrier elements 21 of the packaging units at two fastening points in each case, for example by sewing onto the carrier element 21.

For goods units 3 such as the socks 31 shown, the risk of mechanical damage during insertion into a transport container 8 is fairly low. A bundle according to the invention is nevertheless advantageous for this, because it allows a very efficient provision of the goods units for later filling into transport containers of an intralogistics system.

Typically, goods units 3 are individually packaged during production and these isolated packaging units are in turn packed into a transport container, with which they then reach the processor, for example a mail order center, from the manufacturer. There, they are removed from the transport container and separated, manually or with special apparatuses adapted to the products, for further processing. By contrast, in the case of a bundle according to the invention, the goods units can already be inserted into the packaging units 2 of a bundle 1 according to the invention at the manufacturer, in the continuous production process. The resulting bundle can then be packaged and transported integrally. In the main order center, the bundle 1 can then be easily transferred into individual packaging units 2, which can then be transferred into transport containers of an overhead conveyor system for example.

It is also possible to provide bundles in flexible sizes, by producing the bundle as a continuous chain, from which bundles having the desired number of goods units are then separated.

For goods units 3 in which the mechanical stability of the packaging unit is secondary, it is possible, as explained above, for the carrier strand 11 to also be manufactured from a flexible material, for example as a flexible strip made of paper, plastics material or textile sheet material.

Figures 3, 4:
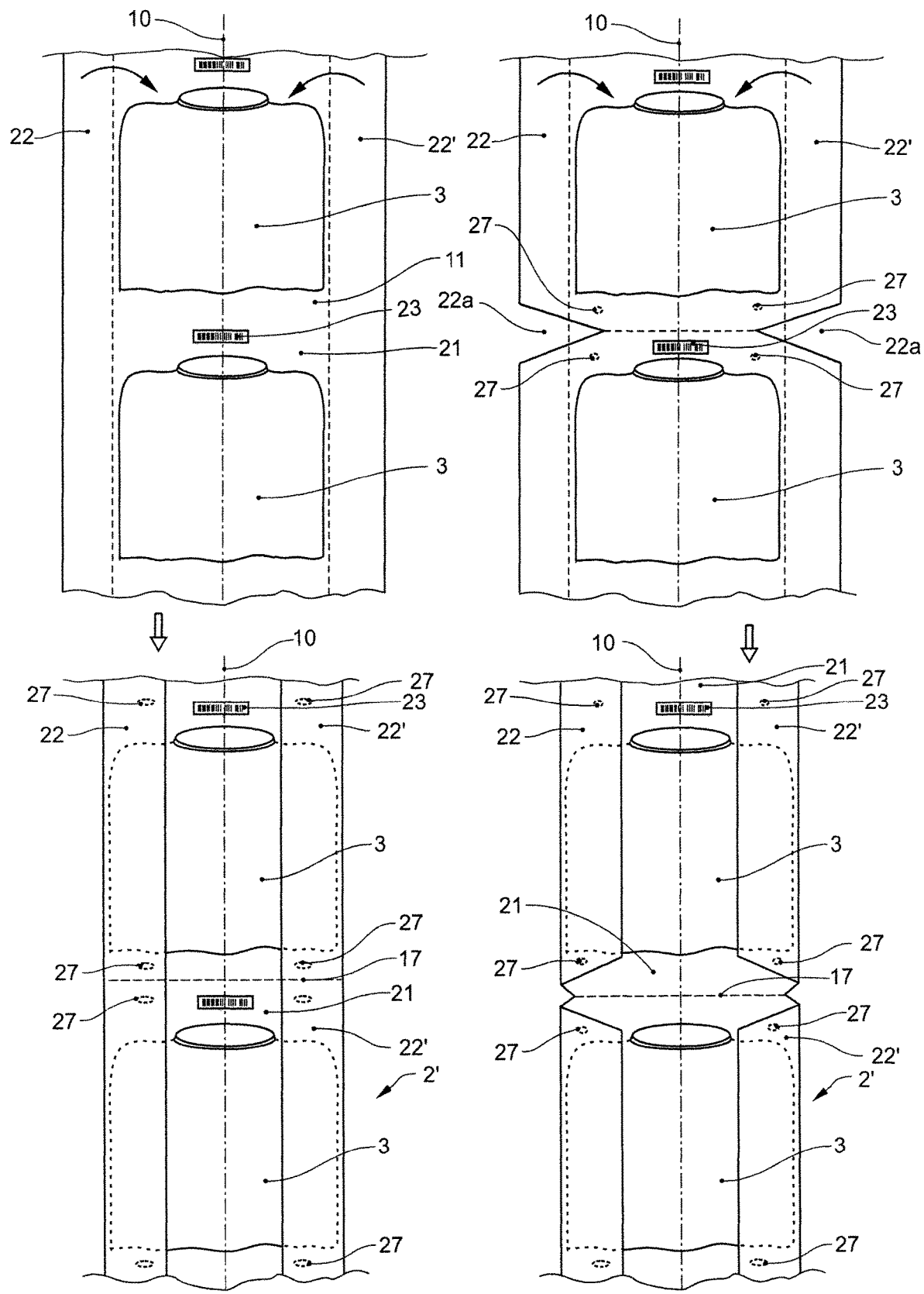
FIG. 3 shows a schematic plan view illustrating the production of a further embodiment of a bundle module according to the invention.
FIG. 4 schematically shows the production of the packaging units in a variant of a bundle according to the invention.

An alternative embodiment of a bundle according to the invention, and the production thereof, is shown in FIG. 3. In order to produce the container 1, a web 11 made of a suitable material, for example paper of suitable thickness, is provided from the roll. The goods units 3, in the example shown a T-shirt or pullover 31, are deposited on a middle strip 21' of the carrier strand 11. The outer edges 22, 22' of the carrier strand 11 are then folded forward, towards the inside, such that the folded outer edges 22, 22' come to lie on the goods unit 3. The outer edges are connected to the central region of the carrier strand 11 lying underneath, for example by gluing or ultrasonic welding, at four connecting points 27.

The goods unit 3, 31 is now held in a form-fitting manner between a rear carrier element 21, which is formed by the original central region of the carrier strand 11, and the second carrier elements 22, 22', which are formed by the folded-over original edge regions of the carrier strand 11.

The perforation line 17 transversely to the longitudinal direction 10 of the carrier strand 11 can either be attached before the outer edges 22, 22' are folded over, or advantageously only after first and second carrier elements 21, 22, 22' are connected.

Since the folded longitudinal edge and the double-layer carrier elements 21, 22, 22' increase the mechanical stiffness compared with the single-layer carrier element 21 from FIG. 1, the material thickness of the carrier strand can be reduced or adapted to the goods unit.

In another variant of such a bundle 1 according to the invention, the production of which is shown in FIG. 4, cutouts 22a are made at the later connection points of the adjacent packaging units in the edge strips 22, 22' which are not yet folded over, which cutouts extend over the entire width of the second carriers 22, 22' and, if necessary, can also extend into the region of the first carrier 21, as shown. The perforation line 17 is arranged between the two cutouts 22a. Adhesive points 27 are provided on the second carrier elements 22, 22'. Such a variant has, inter alia, the advantage that the second carrier elements 22, 22' can better adapt to the shape of the goods unit 3, since the second carrier elements 22, 22' are not continuous in the longitudinal direction.

In a further variant of such a bundle according to the invention, an additional strip can be formed in each case between the two edge regions (the later second carrier elements) and the central region (the later first carrier element) of the carrier strand, which strip forms an outer wall when the packaging unit is completely folded together. In such an embodiment, a certain basic distance between the first and second carrier elements is provided, which is advantageous especially in the case of thicker goods units.

The edge regions 22, 22' can also be designed to be substantially wider than shown, so that after folding over the second carrier elements 22, 22' the front side of the packaging unit is closed.

It is also possible to deposit a second web, for example a transparent film, on the goods units 3 before the second carrier elements 22, 22' are folded over, so that the finished packaging unit is also completely closed at the front. This second web does not have to be connected to the carrier strand 11, since it is held in a form-fitting manner when the bundle is dimensioned appropriately.

Figure 5:
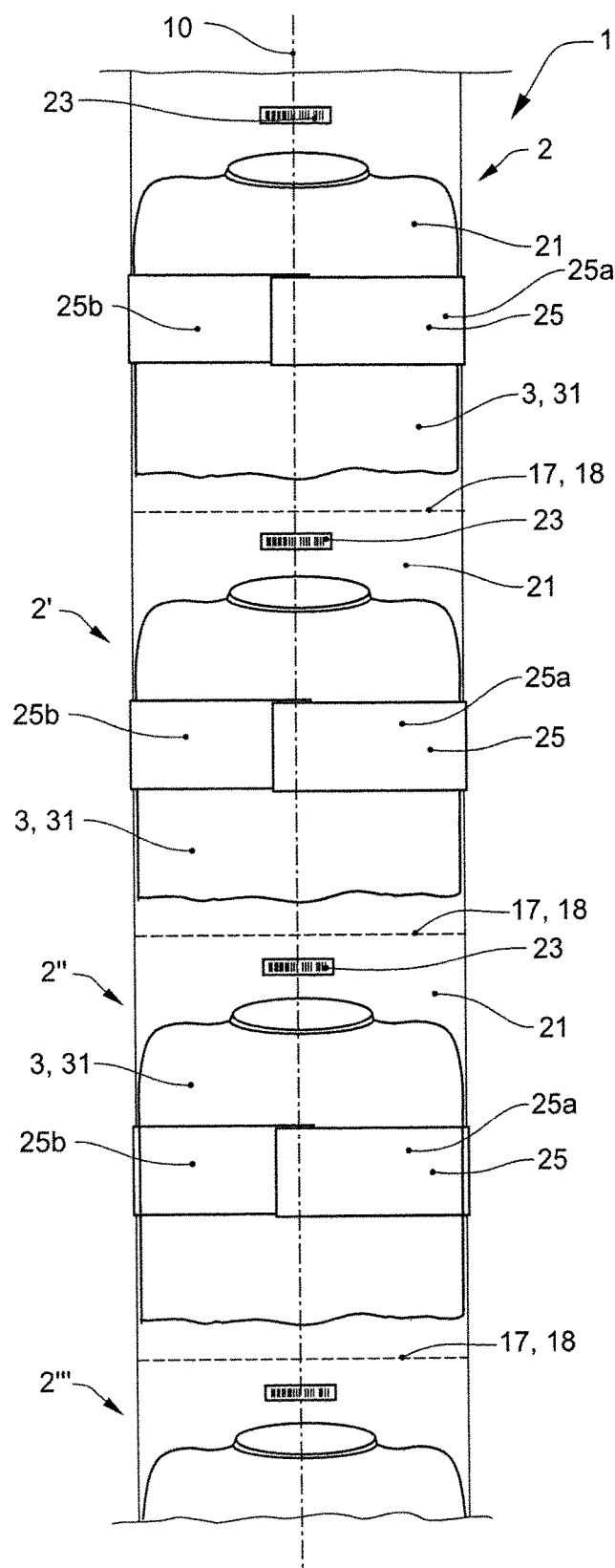
FIG. 5 shows a schematic plan view of yet another embodiment of a bundle according to the invention, in which the goods units are fastened to the bundle by means of bands.

FIG. 5 shows an embodiment of a bundle 1 according to the invention, in which goods units 3 in the form of pullovers or T-shirts 31 are arranged on a single-layer carrier strand 11. In this case, the goods unit is fastened via a band 25. For this purpose, a band strip is fastened to the carrier strand 11 (not shown), and the two tabs 25a, 25b are closed on the front side above the goods unit 3, for example by gluing the tab ends.

Alternatively, the band can also be designed to be continuous on the front side, above the goods unit 3, in such a case the two ends of the band strip being folded around the carrier strand 11 and fastened on the carrier strand 11 on the remote rear side.

Figure 6:
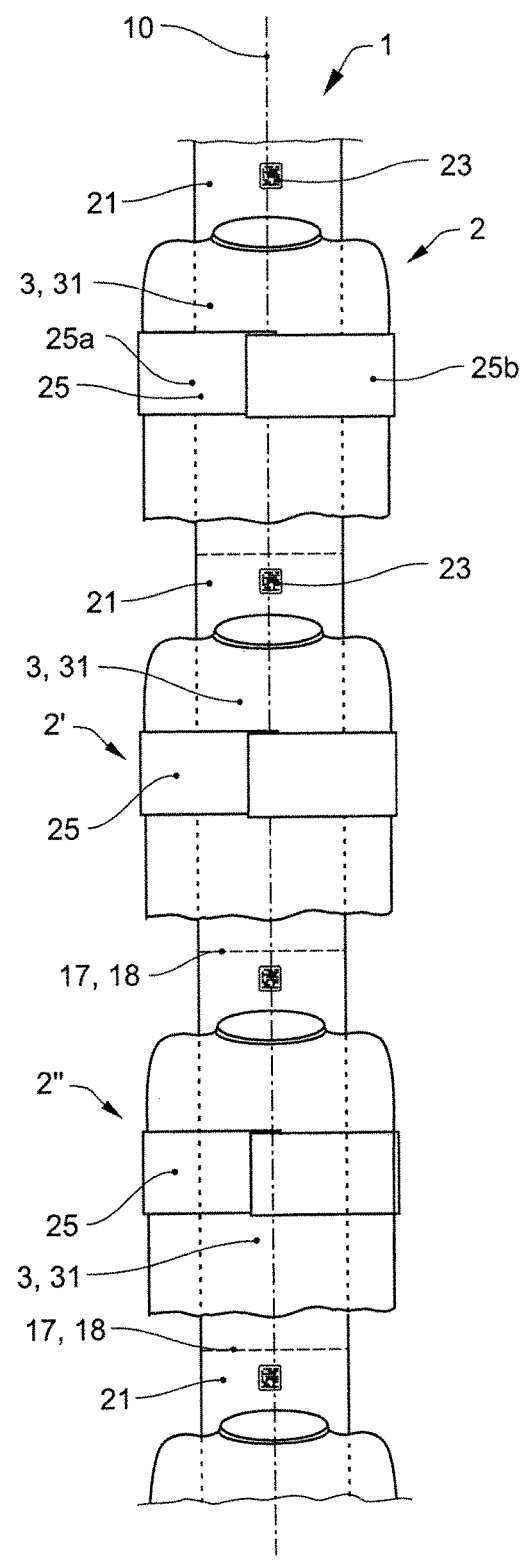
FIG. 6 shows a schematic plan view of a further embodiment of a bundle according to the invention, in which the goods units are fastened to the bundle by means of bands.

The carrier strand 11 can also be designed narrower than the goods unit 3, as shown by way of example in the variant in FIG. 6.

Figure 7A:
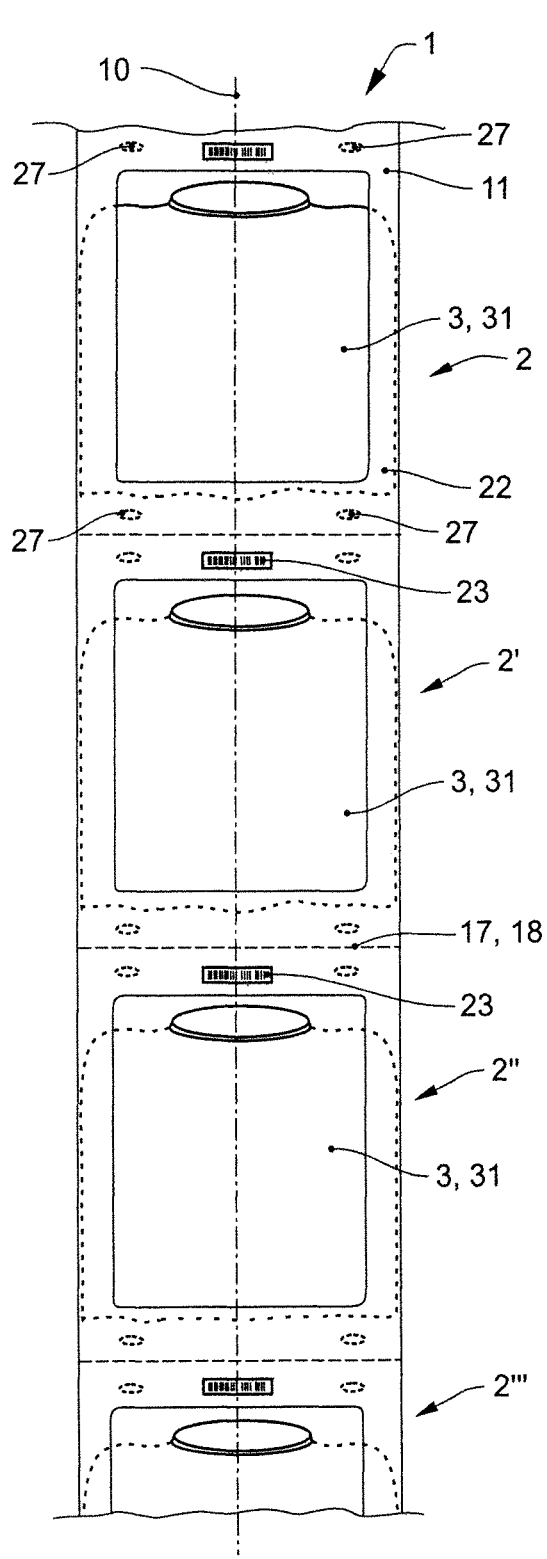
FIG. 7a schematically shows an embodiment of a bundle according to the invention having two-layer packaging units in plan view.
Figure 7B:
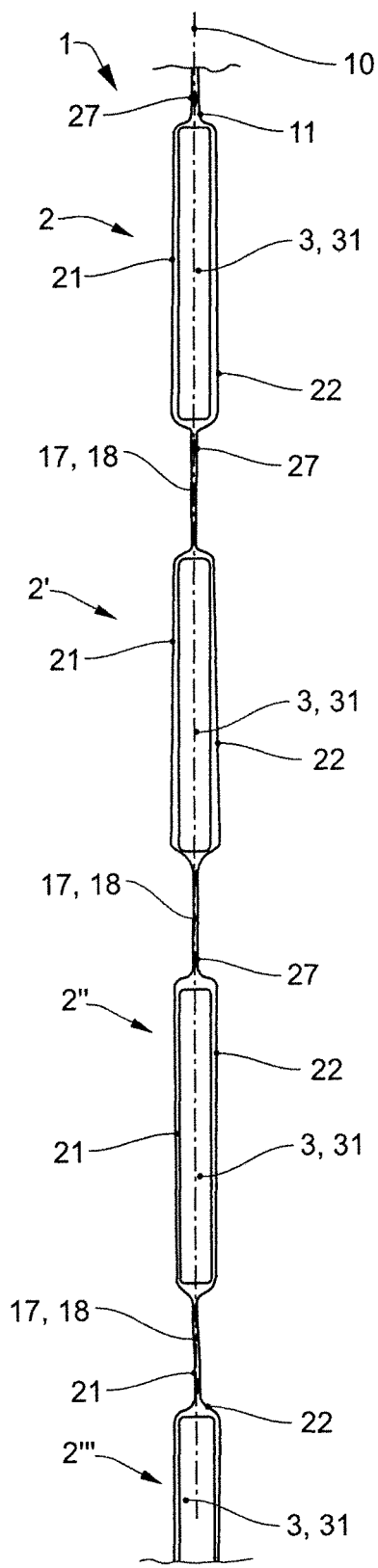
FIG. 7b schematically shows an embodiment of a bundle according to the invention having two-layer packaging units in a side view.

Another variant of a bundle 1 according to the invention, having a two-layer configuration of the packaging units 2, is explained with reference to FIG. 7. The first carrier element 21 made of a suitable flexible material is provided horizontally from the roll. Product units 3, for example in the form of pullovers or T-shirts 31, are arranged on the first carrier element 21 at regular intervals. A second support element 22 is placed thereon, which is also provided from a roll.

At four connection points 27 per packaging unit 2, 2', 2'', 2', the first carrier element 21 and the second carrier element 22 are connected to a carrier strand 11 so that the goods units 3 are fixed in a sandwich-like and form-fitting manner between the two carrier elements 21, 22. A perforation line is attached as a hinge element 17 and predetermined breaking point 18 between adjacent packaging units 2', 2', 2'', 2''' in each case.

In the embodiment shown, a viewing window through which the goods unit 3 is visible is cutout in the second carrier element 22. This viewing window can alternatively also be omitted, or a transparent film can be arranged in the in the viewing window. This film can be fixed, for example, on the inside of the second carrier element 22. However, since the transparent film is fixed in a form-fitting manner within the packaging unit in the case of suitable dimensioning, it can also be placed only on the goods unit.

The two carrier elements 21, 22 are manufactured from a suitable material, for example paper, which is provided in a band-shaped manner.

Figure 8A:
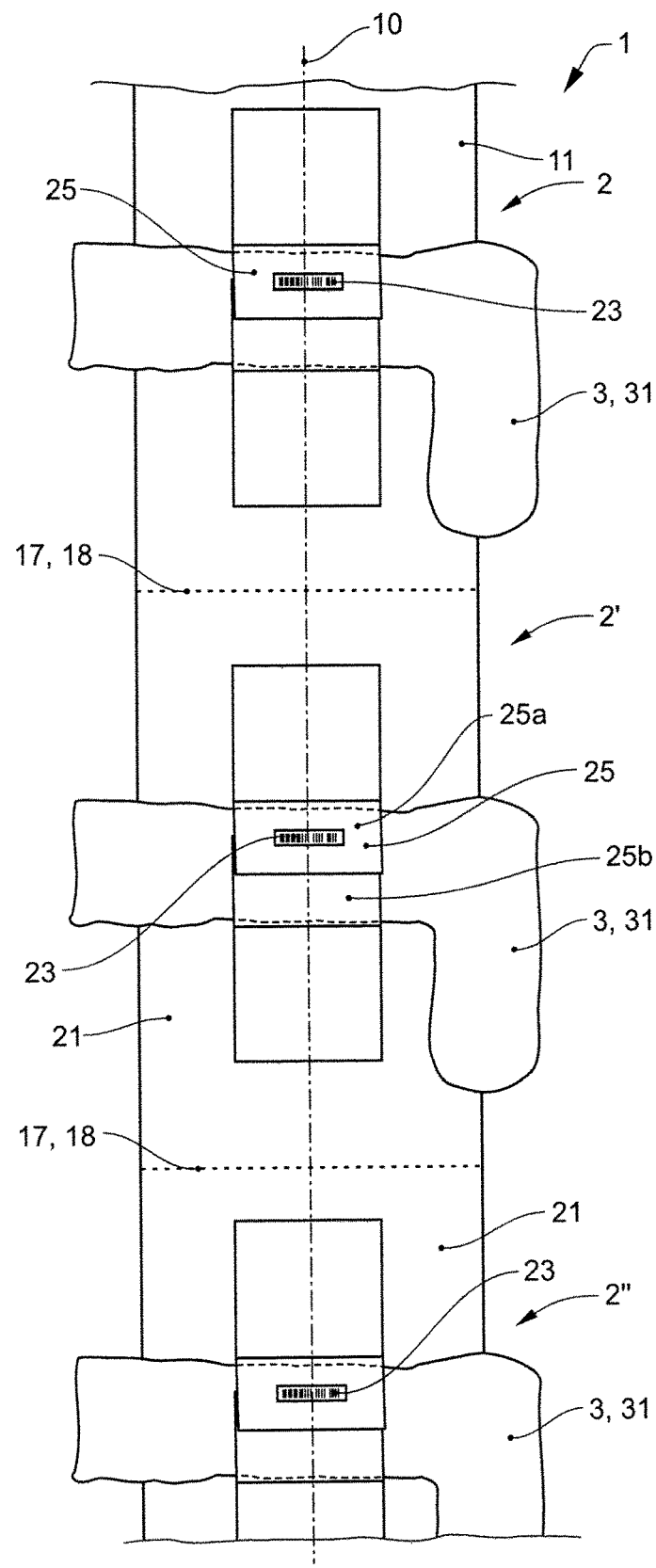
FIG. 8a schematically shows an embodiment of a bundle according to the invention having bands formed from the carrier strand for fastening the goods units in plan view.
Figure 8B:
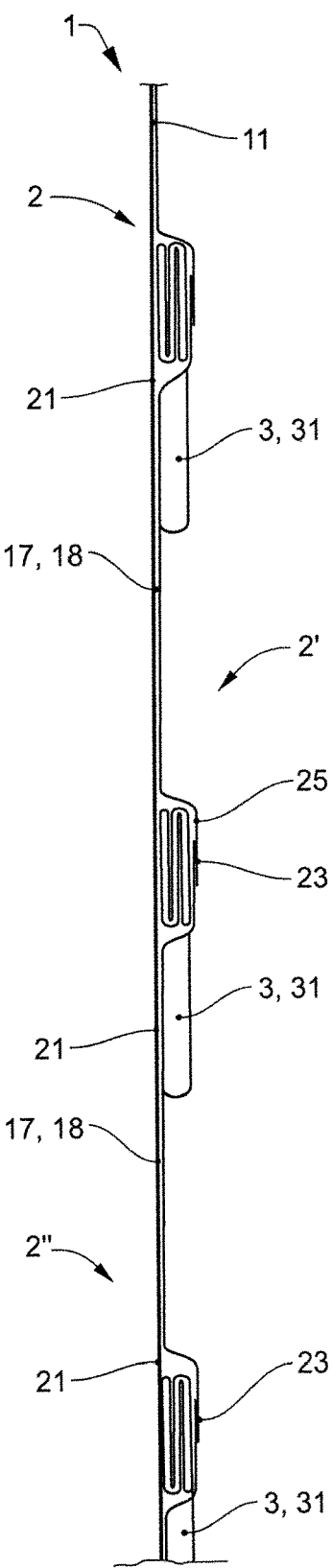
FIG. 8b schematically shows an embodiment of a bundle according to the invention having bands formed from the carrier strand for fastening the goods units in a section along the longitudinal direction.

An advantageous embodiment of a bundle 1 according to the invention is discussed on the basis of FIG. 8, in which the goods units 31 are again fastened to the carrier strand 11 by means of bands 25 formed on the carrier strand 11. In this case, the bands are formed from the carrier strand 11 itself.

In order to produce such a bundle 1, two tabs 25a, 25b are punched out of the carrier element 21 of each packaging unit 2 in the provided band-shaped carrier strand 11, along three sides of a rectangle in each case. After the placement of the goods unit 3, in the example shown a pair of socks 31, in an inner region between the two tabs 25a, 25b, the two tabs 25a, 25b of the band 25 are folded over towards the inner region, around the goods unit 3, and glued to a band 25. A second data element 23 is then also attached to the finished band 25. Again, perforation lines are attached, as predetermined breaking points 18 and/or hinge elements 17, between adjacent packaging units 2, 2', 2'', 2'''.

Figure 9:
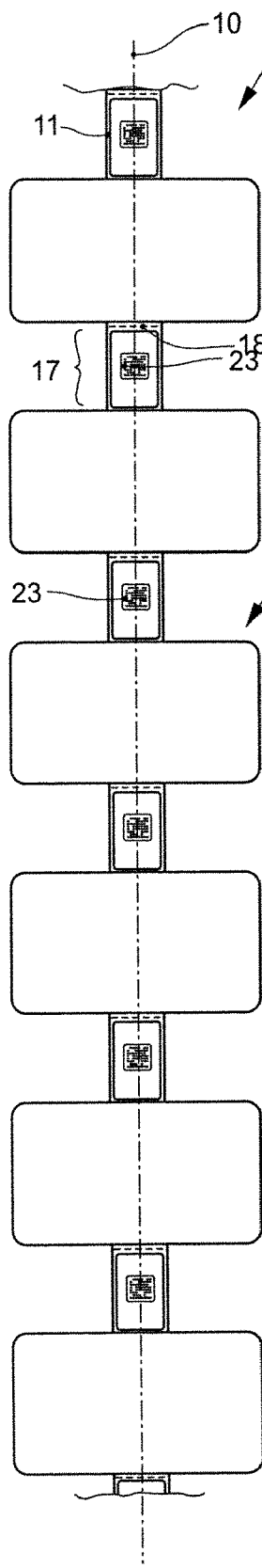
FIG. 9 shows a schematic plan view of an embodiment of a bundle according to the invention having second data elements on the carrier strand between adjacent packaging units.

Instead of creating the packaging units 2, 2', 2'', 2''' of a bundle 1 according to the invention from the carrier strand 1, as in the preceding examples, the packaging units can also be produced separately and then attached to the carrier strand 11 in order to thereby create a bundle 1 according to the invention. For example, FIG. 9 shows such an example of a bundle according to the invention. Packing units 2, 2', 2", 2'" are fastened on a narrow strip-shaped carrier strand 11. In the gaps between the packaging units, second data elements 23 in the form of a two-dimensional QR code are arranged in each case on the carrier strand 11.

Said packaging units 2, 2', 2", 2' are configured as packages in which the goods units (not visible) are arranged.

Such bundles according to the invention are particularly advantageous for packaging units or goods units of limited size and weight, for example smaller domestic articles, cosmetics, electronic devices and data carriers, but also for example medicaments or replacement parts. For such goods, a bundle 1 according to the invention is advantageous due to the significantly lower technical effort of the automatic handling and the separation of the goods.

In order to create a bundle 1 according to the invention, the finished packaging units 2, 2', 2", 2'", including contents, are advantageously fastened, for example glued or welded, to the carrier strand 11 provided as a continuous belt. The at least one corresponding connection point is not visible in the plan view of the figure.

Since the packaging units 2, 2', 2", 2'" are already sufficiently mechanically stable, the carrier strand 11 can be designed to be flexible. In such a case, the entire portion of the flexible carrier strand 11 between two adjacent packaging units acts as a hinge element 17. In the example shown, a predetermined breaking point 18 is also assigned to the carrier strand 11 of each packaging unit 2. However, this can alternatively also be omitted. For example, for separating a single packaging unit, the relative narrow carrier strand 11 between two packaging units can be simply cut through.

Alternatively, it is also possible to release the connection between the carrier strand and packaging units in another manner, for example by conveying a packaging unit in a laterally supported manner, and at the same time pulling away the carrier strand downwards, so that the packaging unit is peeled off or torn off from the carrier strand. The carrier strand that is no longer required can then be used again or recycled.

Instead of as a mechanically stable object, the packaging units can also be designed as bags, for example.

Figure 10:
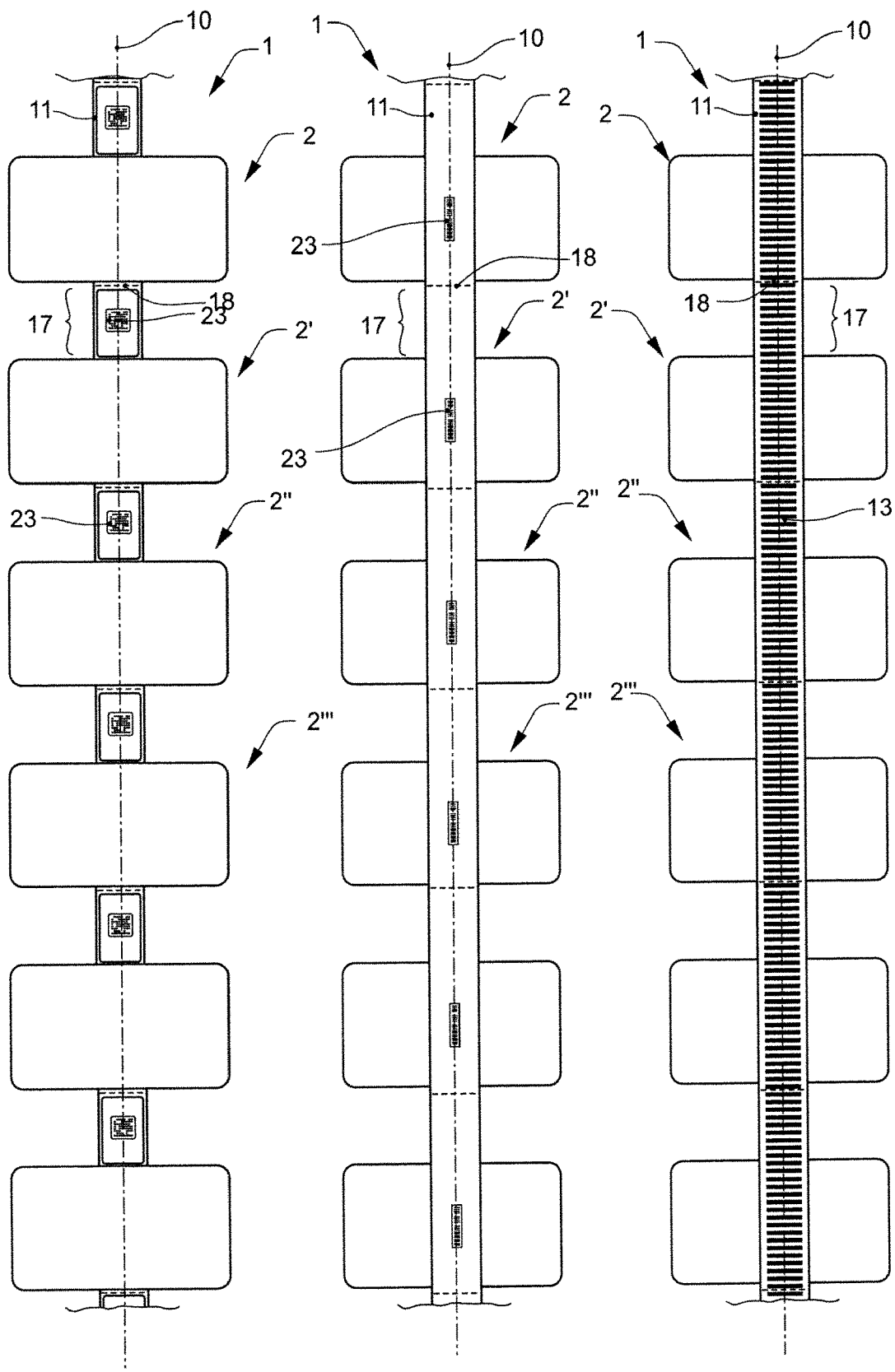
FIG. 10 shows a schematic view from below of an embodiment of a bundle according to the invention having second data elements on the rear side of the carrier strand.

Alternatively, or additionally, second data elements 23 can also be provided on the rear side of the carrier strand 11, as shown by way of example in FIG. 10.

Figure 11:
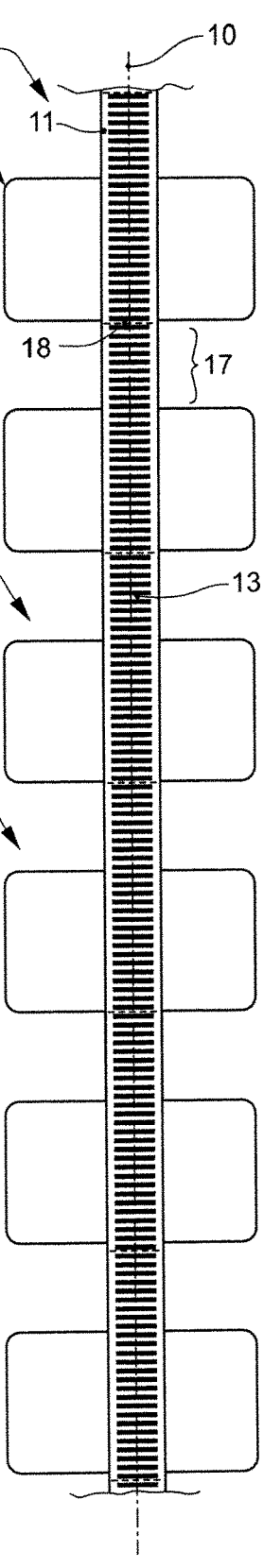
FIG. 11 shows a schematic view from below of an embodiment of a bundle according to the invention having position markings on the rear side of the carrier strand.

FIG. 11 shows a bundle 1 according to the invention analogous to FIG. 9, in which position markings in the form of a line pattern are attached on the rear side of the carrier strand 11. By registering and counting the line markings using a suitable sensor during conveying of the bundle 1 along the longitudinal direction 10, the current position in relation to the entire carrier strand can thus be determined.

The variant shown in the aforementioned figures, having functionally separate packaging units and carrier strand, can also be used for larger packaging units. In this case, without disadvantageous influence on the intended use, the carrier strand can be designed in a material-saving manner, in that the carrier strand is formed in two parts or in multiple parts.

Figure 12:
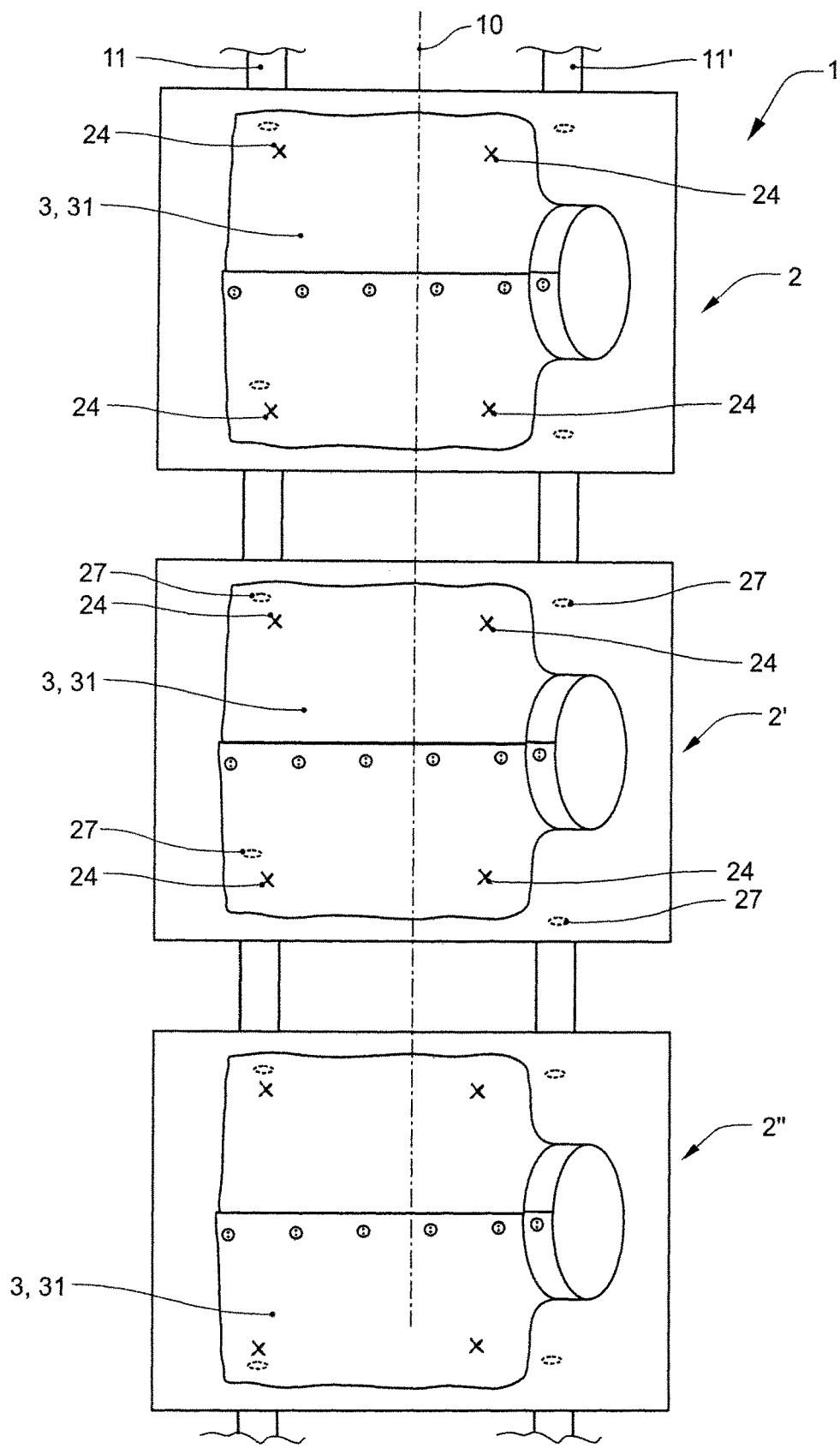
FIG. 12 shows a schematic plan view of an embodiment of a bundle according to the invention having two parallel carrier strands.

Such a variant of a bundle 1 according to the invention is shown in FIG. 12. Two strip-shaped carrier strands 11, 11' are guided in parallel with a longitudinal direction 10. A packaging unit 2, 2' is connected in each case to the carrier strands 11, 11' at four connection points 27.

In the example shown, the packaging units 2, 2' comprise a mechanically stable carrier element 21, on which a goods unit 3 in the form of a shirt 31 is reversibly fixed at four fastening points. Alternatively, the packaging units can also be designed as packages, bags or other closed containers.

The embodiment of a bundle 1 according to the invention shown in FIG. 12 is particularly suitable for mechanically releasing the packaging units 2, 2' from the carrier strands 11, 11' again. For example, the packaging units of a fed bundle can be placed on one or more horizontal belt conveyors extending in parallel with the longitudinal direction 10. If the carrier strands 11, 11' are then guided away from the belt conveyor downwards, the carrier strands tear away from the packaging unit at the connection points 27. The now isolated packaging unit can be conveyed further on the belt conveyor, in order, for example, to be inserted subsequently into a ready transport container of an intralogistics conveyor system.

In addition to the simplified conveying, bundles 1 according to the invention also have the advantage that they are efficiently stored in a transport container 19 for transport from the manufacturer to an intralogistics system, and can subsequently also be removed again in an automated manner for further use, which is explained with reference to FIG. 13.

A bundle analogous to FIG. 9 is stored in a container 19 in the form of a cardboard box, in that the bundle 1 is deposited in layers in the manner of a fanfold. The bundle 1 is then removed from the transport box 19 in the reverse sequence.

The mass of the packaging units 2, the box 19 and the distances of the packaging units from one another on the carrier strand 11 are advantageously matched to one another in such a way that the highest possible packing density is achieved. Advantageously, the packaging units of one layer are each supported on the packaging units of the underlying layer.

Figures 14, 15:
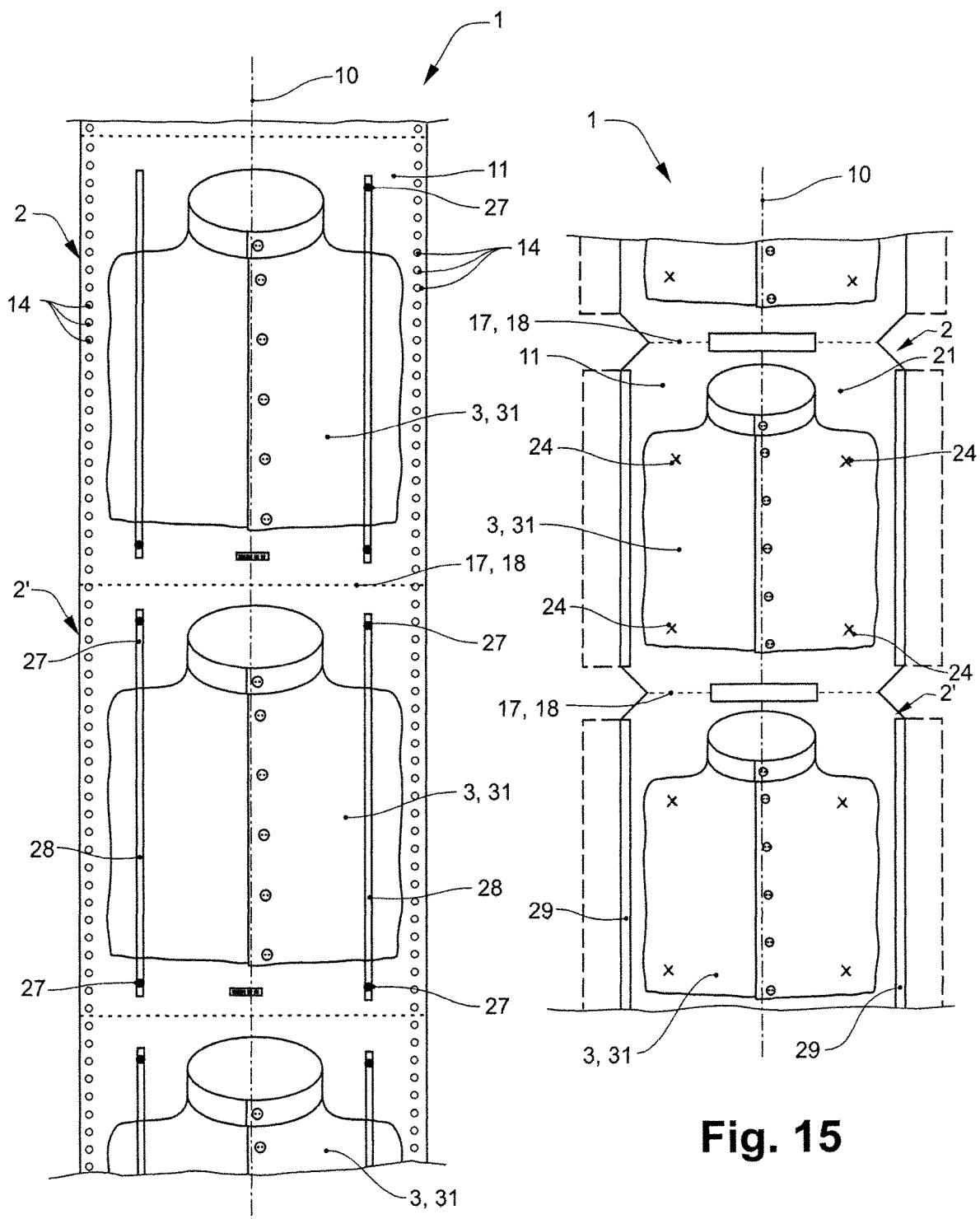
FIG. 14 shows a schematic plan view of a further bundle according to the invention having lateral punched strips.
FIG. 15 shows a schematic plan view of another bundle according to the invention having lateral stiffening elements.

Another embodiment of a bundle 1 according to the invention is shown in FIG. 14. Product units 3 in the form of shirts 31 are arranged on a carrier strand 11, which is designed analogously to FIG. 1 as an integral chain of individual carrier elements 21 separated from one another by predetermined breaking points 18. In this case, the goods units are fastened to the carrier element 21 by clamping elements 28. Such clamping elements can be designed, for example, as resilient, stretched bands, for example resilient cords or resilient rod-shaped elements, which are connected to the carrier element 21 at connection points 27.

Functionally independently of this variant of the fastening of the goods units 3 on the carrier elements 21 of the packaging units 2, the carrier strand 11 is provided on the outer edges with conveying active elements in the form of punched strips 14. Corresponding conveying means, for example in the form of needle wheels, can come into operative connection with these punched strips, in order to ensure precise and reliable conveying of the bundle 1 along the longitudinal direction 10.

Yet another variant of a bundle 1 according to the invention can be seen in FIG. 15. The carrier strand 11 is again configured as a chain of packaging units 2 connected to one another at perforation lines 17. A rectangular recess, which can be produced, for example, by punching out, is provided in the center of the perforation line 17, in the material of the carrier strand 11 or the carrier elements 21. This leads to a further mechanical weakening of the connection point of the packaging units, which can be used to optimize the function of the hinge element 17 or the predetermined breaking point 18. At the edges, triangular recesses are provided, which have the same effect.

In order to be able to minimize the material thickness of the carrier strand 11 and nevertheless achieve the necessary mechanical stiffness of the carrier element 21, stiffening elements 29 are arranged on the outer edges of the carrier elements 21. These are produced in that a corresponding lateral portion of the carrier strand 11 (shown in dashed lines) is provided with adhesive and rolled up from the outside towards the inside, to form a thin but rigid tube 29.

Alternatively, such a stiffening element can also have a triangular or square cross section. Instead of an adhesive connection, form-fitting fixations can also be provided, such as, for example tuck-in tab connections.

Figure 16:
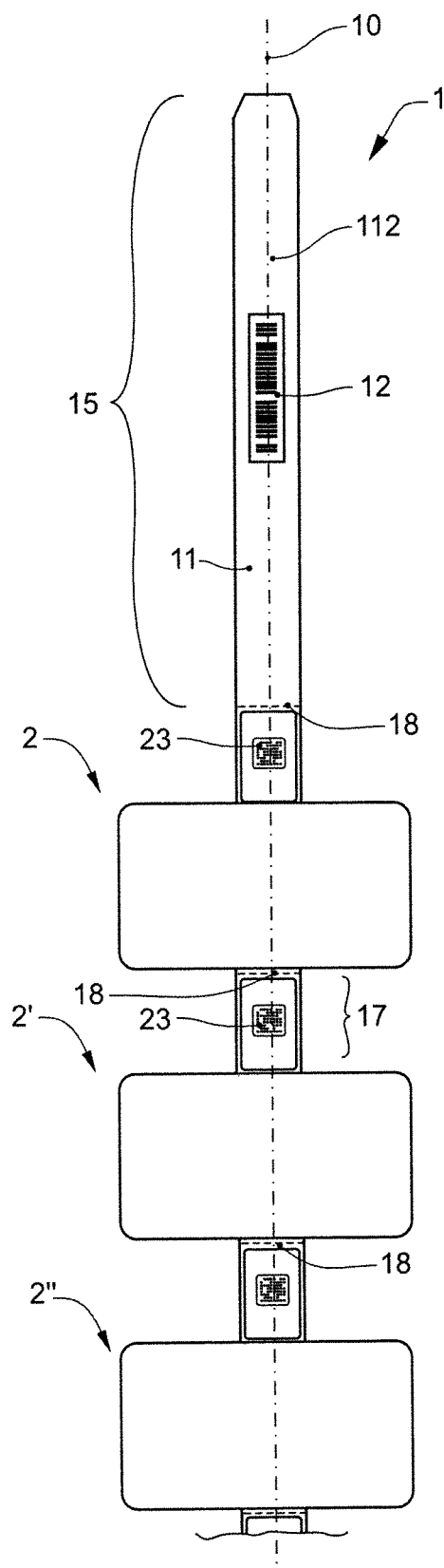
FIG. 16 shows a schematic plan view of a bundle according to the invention as shown in FIG. 9, having a start element at the first end of the carrier strand.

FIG. 16 shows a possible embodiment of an initial region 112 of the bundle 1 according to the invention from FIG. 9. A start element 15 is provided at the first end 112, in the form of a portion of the carrier strand 11 without packaging units. The tip of the start element 15 is tapered in order to facilitate the insertion of the start element 15 into a processing or conveying device.

A first data element 12 in the form of a one-dimensional barcode is arranged on the start element 15. This first data element 12 is logically assigned to the entire bundle and can, for example, contain information on the length of the bundle, the type and number of packaging units, the goods units contained therein, their position with respect to the carrier strand, etc. It is also possible to provide data therein that allow a processing device to adapt to the specific bundle and adjust the machine settings and process parameters accordingly. In this way, it is possible to realize a processing device, such as a device 6 according to the invention for inserting goods units into a transport container, such that it can process more than one type of bundles 1 according to the invention. In this case, the correct adjustment can take place automatically so that different kinds and types of bundles 1 according to the invention can be processed as far as possible without manual changeover work and with minimal idle times.

Figure 17:
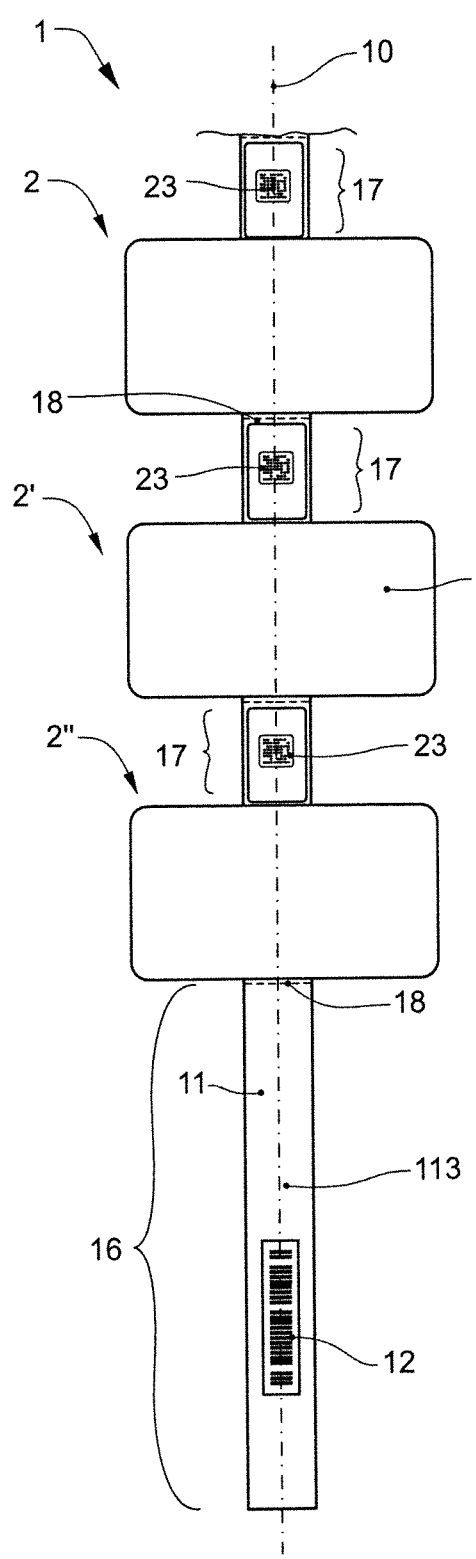
FIG. 17 shows a schematic plan view of a bundle according to the invention as shown in FIG. 9, having a termination element at the second end of the carrier strand.

A termination element 16 can be provided analogously at a second end 113 of a bundle 1 according to the invention, as shown in FIG. 17. Such a second data element 12 makes it possible, for example, to indicated the end of the bundle 1. It can also contain information which allows the verification of the bundle 1 just processed, in order, for example, to be able to discover and correct processing errors in a timely manner.

Figure 18:
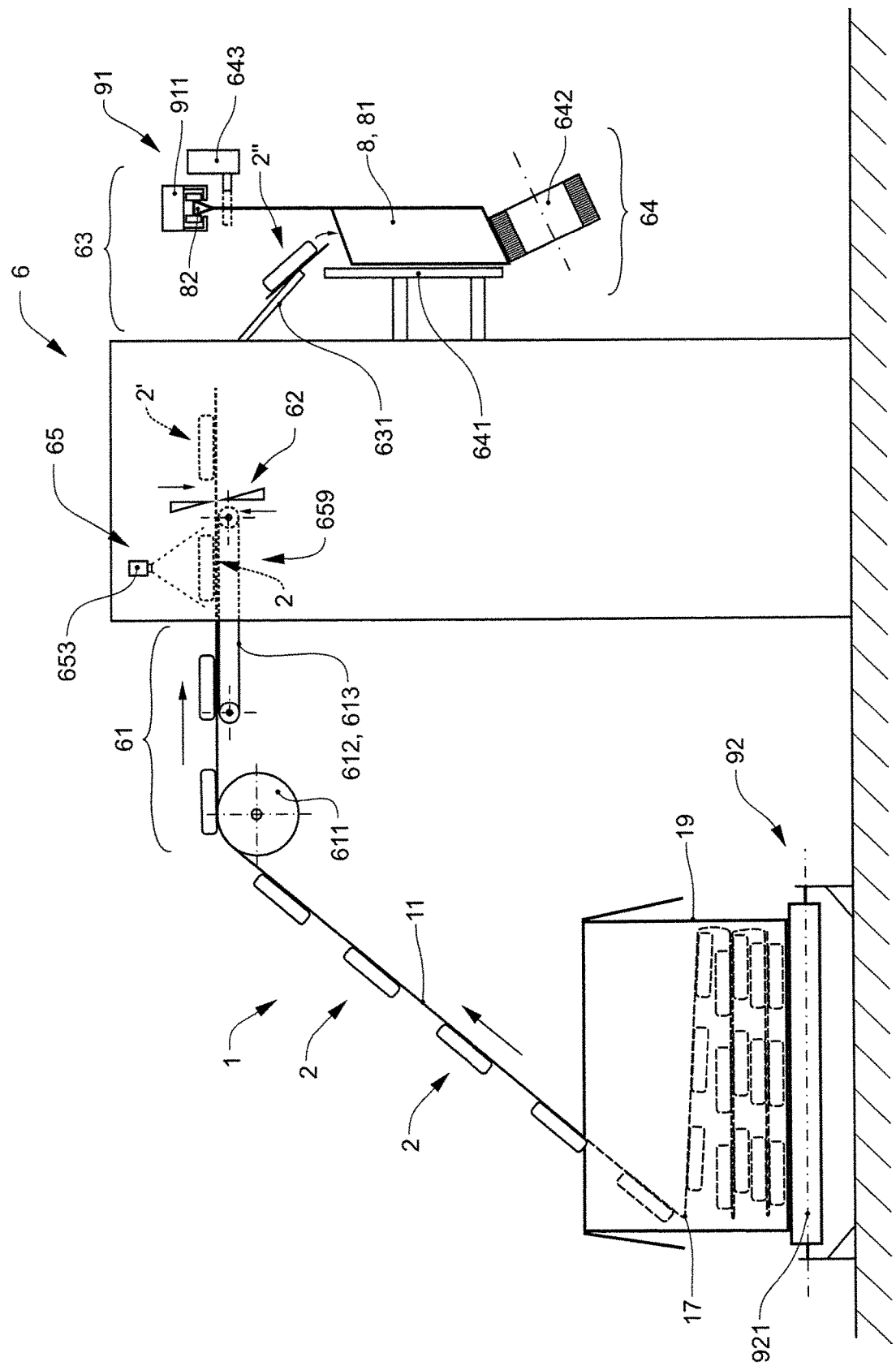
FIG. 18 shows a schematic side view of a device according to the invention for inserting goods units into a transport container.

An advantageous embodiment of a device 6 according to the invention for inserting goods units 3 into a transport container 8 is shown schematically in FIG. 18.

A provided bundle 1 according to the invention in a transport container 19 according to FIG. 13 is provided. In the embodiment shown, the providing takes place on a belt conveyor 921 of a conveyor system. Alternatively, the transport container 19 with the bundle 1 can also be provided manually.

The provided bundle 1 according to the invention is guided via a deflecting roller 611 of a feed module 61 of the device 6 according to the invention onto a horizontal conveying device 613 of the mentioned feed module in the form of a belt conveyor 612. In this case, the propulsion of the bundle strand takes place via drive means (not shown). An identification module 65 of the device 6 is equipped to read out the data element 23 of each packaging unit 2 at an identification position 659 using a camera 653. Advantageously, the identity of the packaging unit 2 can be compared with the read-out data element 23 and verified, on the basis of the acquired image. A separation module 62 is provided to separate a packaging unit 2' from the bundle 1 by severing the carrier strand 11 at the predetermined breaking point.

The separated packaging unit is conveyed to an insertion module 63 of the device 6, for example by means of a belt conveyor or, driven by gravity, on a chute 631. In the case of the insertion module 63, the packaging unit 2" reaches a conveying device 631, for example a chute, which allows the packaging unit to slide into an opening of a transport container 8, in the present example into an overhead conveyor bag 81 of an overhead conveyor system 91.

The overhead conveyor bag 81 is transferred from a closed state (not shown) into an open filling state by a module 64 for providing transport containers of the device according to the invention. One possible example of a suitable module for providing transport containers of this kind is disclosed, for example, in US 2019/0367282 A1.

While an empty overhead conveyor bag 81, already in the orientation provided for filling, is conveyed in a suspended manner on a carriage 82 guided in a running rail 911, the base of the overhead conveyor bag is lifted by a sequence of roller-like actuators 642, as a result of which the suspended conveyor bag is opened. A lateral stop element 641 stabilizes the suspended conveyor bag horizontally, transversely to the conveying direction of the overhead conveyor system. The overhead conveyor bag is stopped and fixed with respect to the running rail 911 by means of a stop element 643. The overhead conveyor bag is now in the filling state. The packaging unit 2" separated from the bundle 1 according to the invention can be inserted into the suspended conveyor bag 81. After the filling, the stop element 643 releases the overhead conveyor bag 81 again. The filled overhead conveyor bag 81 is conveyed further in the overhead conveyor system 91, and the next empty overhead conveyor bag is brought up for filling.

Two or more separated packaging units 2, 2', 2" can also be inserted one after the other into an overhead conveyor bag 81 that is provided for filling.

Advantageously, the identity of a packaging unit that is previously determined using the identification module and is inserted into an overhead conveyor bag is linked to the identity of the corresponding overhead conveyor bag, for example in a database of the overhead conveyor system.

In particular, the identity of the overhead conveyor bag can be determined for this purpose using a suitable device (not shown). This can take place before, during or after the filling. For example, a unique identification number can be read out from an optical data element assigned to the overhead conveyor bag, such as a barcode or a QR code, or an RFID element, by a corresponding reader device (barcode scanner, camera, RFID reader unit).

Alternatively, or additionally, the identity of a packaging unit inserted into an overhead conveyor bag can be written into a data memory unit of the overhead conveyor bag. For example, a corresponding entry can be written by a suitable transmitting unit can into a writable RFID element of the overhead conveyor bag.

Figure 19:
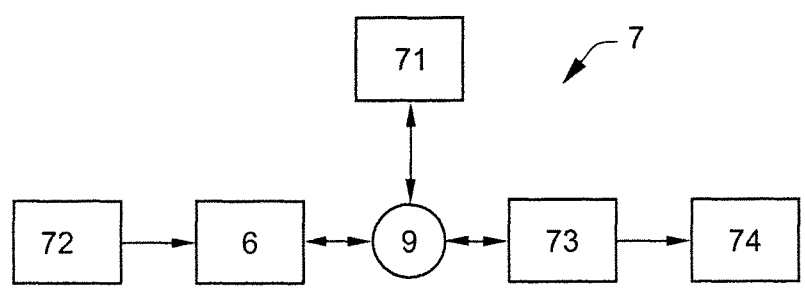
FIG. 19 shows a schematic view of a device according to the invention as part of an intralogistics system.

A device 6 according to the invention is advantageously integrated into a conveyor system 9, in particular a conveyor system of an intralogistics system 7, as shown by way of example as a diagram in FIG. 19. Bundles 1 according to the invention are transported from an external manufacturer to a goods inlet 72. In the goods inlet 72, the bundles 1 are then fed directly into a device 6 according to the invention, which guides the isolated packaging units, having the goods units stored therein, into transport containers of the corresponding conveyor system 9. The transport containers 9 filled in this way can then subsequently be temporarily stored in a warehouse 71, or they are fed to a picking system 73 which then supplies completed orders to a goods output 74.

Figure 20:
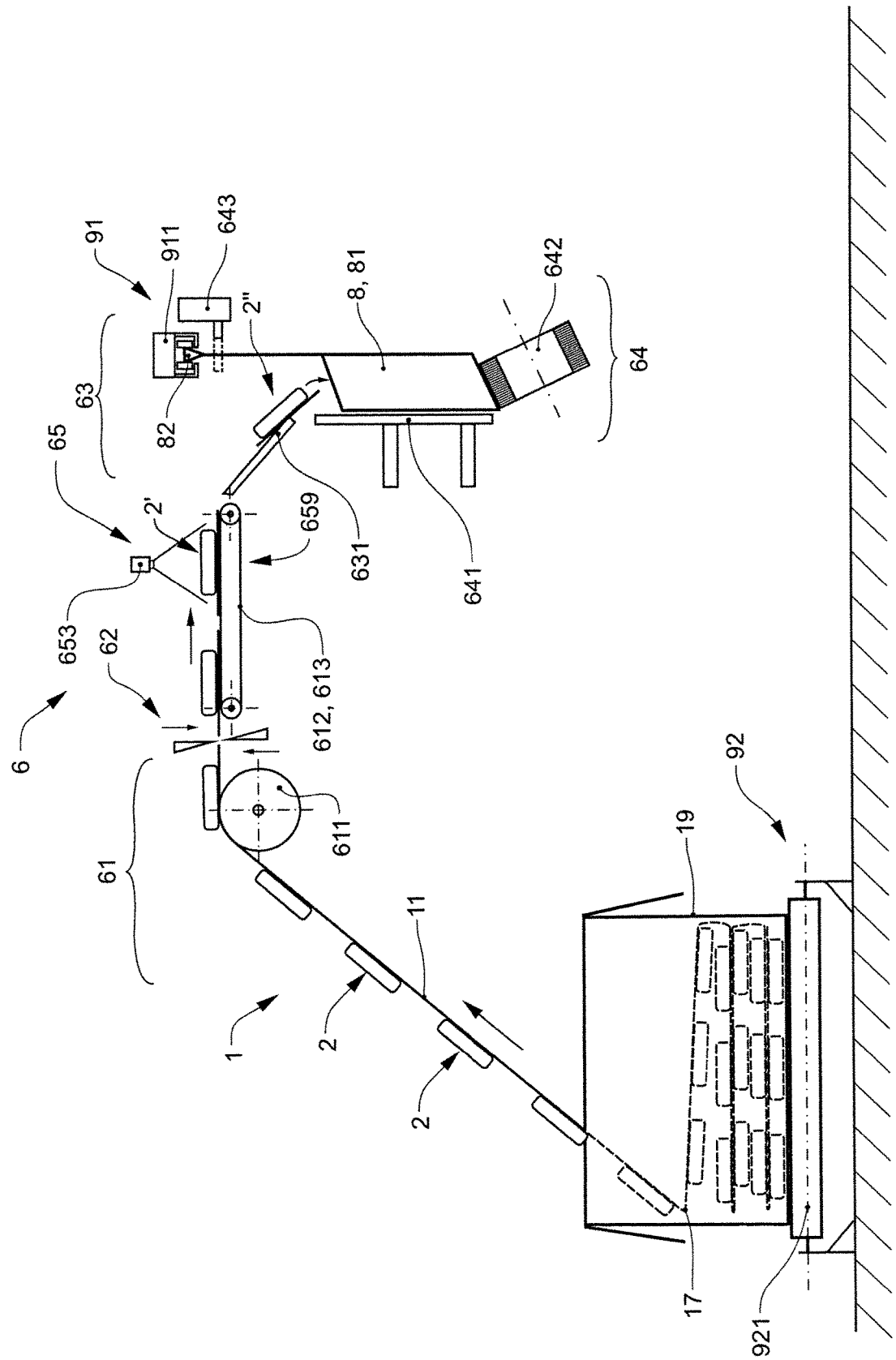
FIG. 20 shows a schematic side view of a further device according to the invention for inserting goods units into a transport container, in the form of an overhead conveyor bag.

A further advantageous embodiment of a device 6 according to the invention for inserting goods units 3 into a transport container 8 is shown schematically in FIG. 20. This device corresponds in some parts to the device from FIG. 18, and reference is made to the statements in this regard, in order to avoid repetition.

The bundle 1 provided is guided, via a deflecting roller 611 of a feed module 61 of the device 6, onto a horizontal conveying device 613 of the feed module 61 in the form of a belt conveyor 612. A separation module 62, which is provided to separate a packaging unit 2' from the bundle 1, by severing the carrier strand 11 at the predetermined breaking point, is arranged between the deflecting roller 611 and the belt conveyor 612. The packaging element 2' thus isolated and lying on the belt conveyor 612 is then conveyed further. An identification module 65 of the device 6 reads the data element 23 of the packaging unit 2' using a camera 653. Advantageously, the identity of the packaging unit 2 can in turn be compared with the read-out data element 23 and verified, on the basis of the acquired image.

The separated packaging unit then enters the overhead conveyor bag 81 of an overhead conveyor system 91 in a sliding manner, via a chute 631 of the insertion module 63 of the device 6.

Figure 20A:
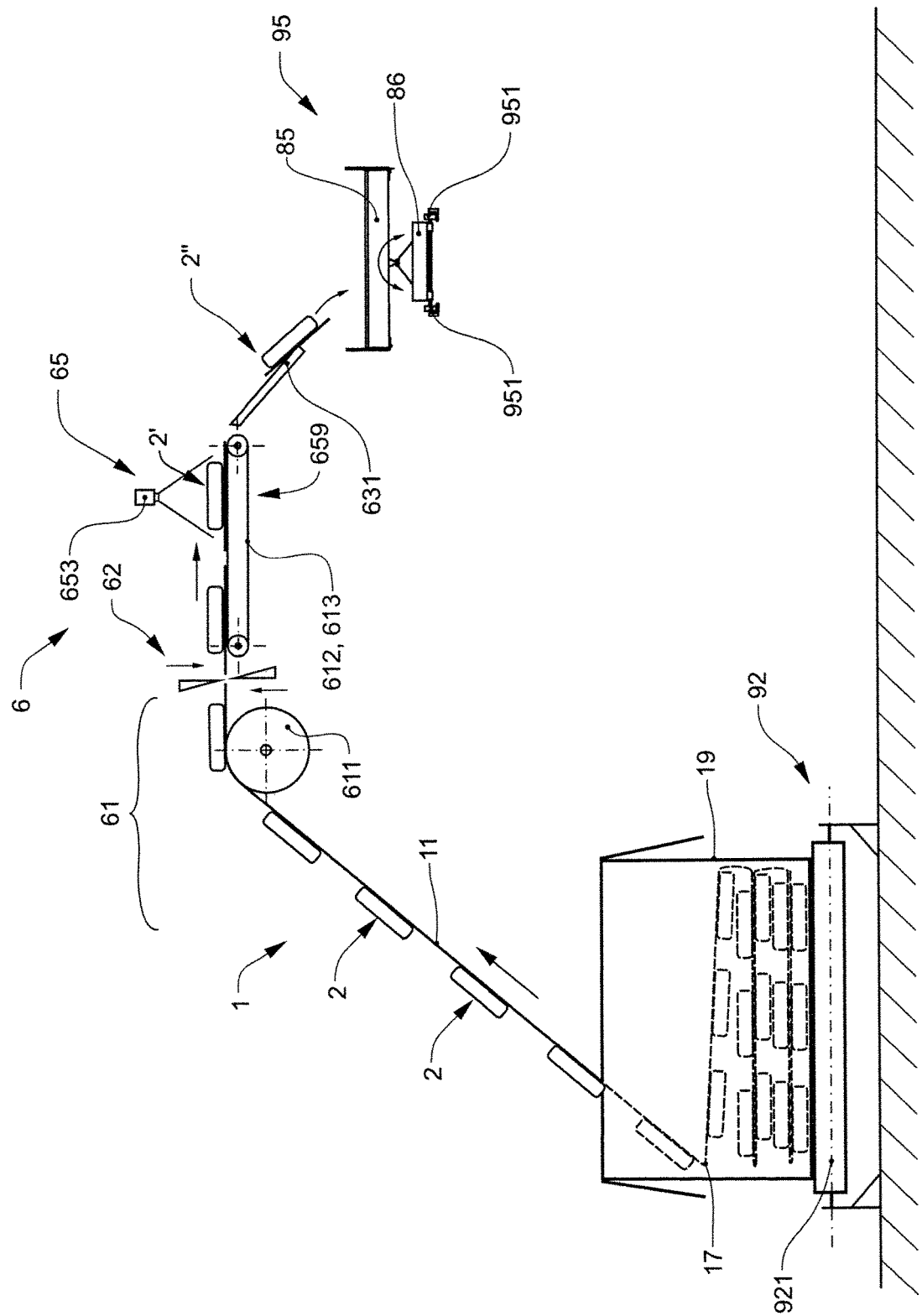
FIG. 20a shows a schematic side view of a further device according to the invention for inserting goods units into a transport container, in the form of a conveying tray.

A further advantageous embodiment of a device 6 according to the invention for inserting goods units 3 into a transport container 8 is shown schematically in FIG. 20a. This device corresponds, with respect to the device 6 for the insertion of goods units, to FIG. 20, and reference is made to the statements in this regard in order to avoid repetition.

The separated packaging unit is conveyed to an insertion module 63 of the device 6. In the insertion module 63, the packaging unit 2" reaches a conveying device 631 in the form of a chute, which allows the packaging unit to slide into an opening of a transport container 8, in the present example into a conveying tray 81 of a tilt tray conveyor 95.

In the case of such tilt tray conveyor systems 95 known from the prior art, conveyor trays 85 which can be tilted transversely to the conveying direction on one or two sides are mounted on carriages 86, which are guided in a rolling manner in a running rail 951. The carriages 86, which are uniformly spaced apart from one another, are coupled to a revolving chain drive (not shown) and move with constant velocity.

Advantageously, the belt conveyor 612 is controlled in such a way that a packaging unit gets on the chute 631 when a conveying tray 85 of the tilt tray conveyor 95 is located below the chute 631.

Alternatively or in addition, a stopper element can be provided at the end of chute 631, for example in the form of a pivotable flap at the end of the chute 631, which can swing up. In the swung-up state, the flap can retain a packaging unit on the chute. When a conveying tray of the tilt tray conveyor is located below the chute, the flap swings down, and the retained packaging unit drops into the conveying tray.

In the devices 6 discussed above, the feed module 61 can have one or more horizontal conveyor units arranged in series before and/or after the belt conveyor 612, which can be actuated selectively. In this way, an advantageous buffer storage can be realized, which facilitates synchronization of the provision of the packaging units and the overhead conveyor bags.

Figure 21:
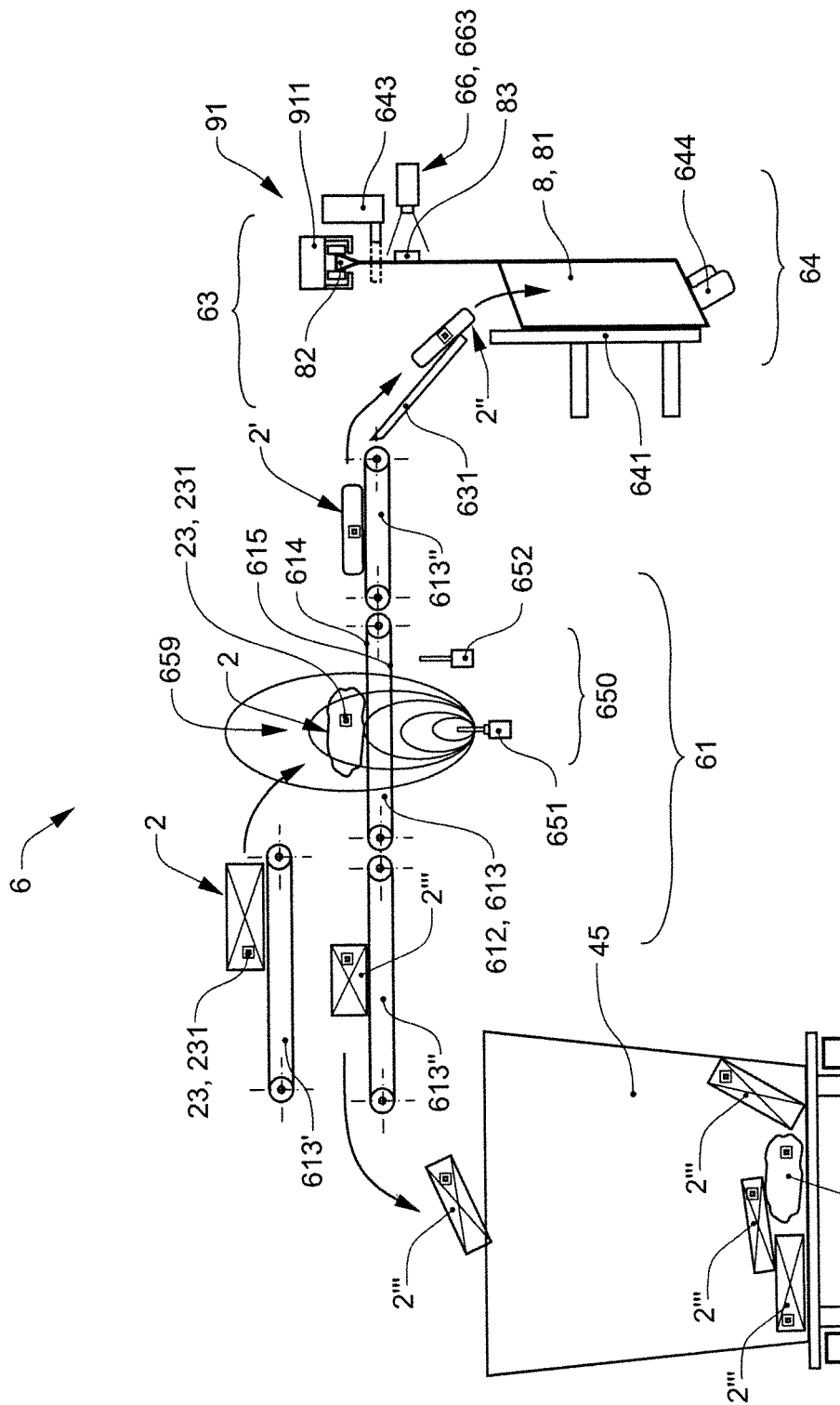
FIG. 21 shows a schematic side view of a further device according to the invention for inserting goods units into a transport container, having a sorting function.

A further device 6 according to the invention for inserting goods units into a transport container is shown in FIG. 21.

A flat good unit in the form of a packaging unit 2 is fed by means of a horizontal conveying device 613' and falls onto the feed module 61 comprising a horizontal conveying device 613 in the form of a belt conveyor 612. The packaging unit 2 is conveyed on the belt conveyor 612 to the identification position 659 so that the packaging unit 2 is located in the detection region of the RFID reader unit 650.

The RFID reader unit has an RF transmitter 651 and an RF receiver 652 which are both arranged below the feed module 61. By means of the RF transmitter 651, the data element 23, in the form of a passive RFID transponder which is arranged on the packaging unit 2, is put into operation, and thereupon transmits identification data. These identification data are received by the RF receiver 652 and forwarded to a control device (not shown).

If the identification of the packaging unit 2 on the feed module 61 is successful, it is conveyed to the right, onto a further horizontal conveying device 613", which finally transfers the packaging unit 2' to a chute 631 of an insertion module 63, on which the packaging unit 2" slides into a provided overhead conveyor bag 81. As in the preceding figures, the overhead conveyor bag 81 comprises a carriage 82 which is guided in a running rail 911 of the overhead conveyor system 91.

In contrast to FIGS. 18 and 20, the overhead conveyor bag 81 is not brought into the open position by rollers, but rather by a guide rail 644 arranged along the conveying path of the overhead conveyor system. The transport bag of the overhead conveyor bag 81 suspended on the carriage 82 has, at an upper end, a readable data element 83 which allows identification of the overhead conveyor bag 81. In the example shown, the data element is designed as an optically readable data element, for example as a barcode or QR code. This transport container data element 83 can be read by a camera 663 of a second identification module 66. Alternatively, the data element 83 can also be realized as an RFID element which can be read by an RFID reader unit of the second identification module 66.

If the identification of a packaging unit 2 on the feed module 61 fails, or if a different exception occurs, the packaging unit 2 is instead conveyed to the left onto a horizontal conveying device 613'. This horizontal conveying device 613' finally transfers the packaging unit 2" to a collection container 45. In the example shown, the horizontal conveying device 613' moves the packaging unit 613' into a trolley 45.

The embodiment shown of a device 6 according to the invention has the advantage in particular that, in the case of a failed identification, the resulting error state of the device 6 can be quickly resolved. The first identification module 61 can be released again quickly, without a manual intervention being necessary. The resulting downtimes are minimal.

The packaging units 2" thus sorted out into the collection container 45 can then be manually checked later and optionally fed back into the intralogistics system. A failed identification of a packaging unit can be attributed, for example, to a damaged or missing data element.

The device 6 shown can also be used to remove certain packaging units from the logistics system, for example in the case of product recalls or in the case of an expired use-by date.

Figure 22:
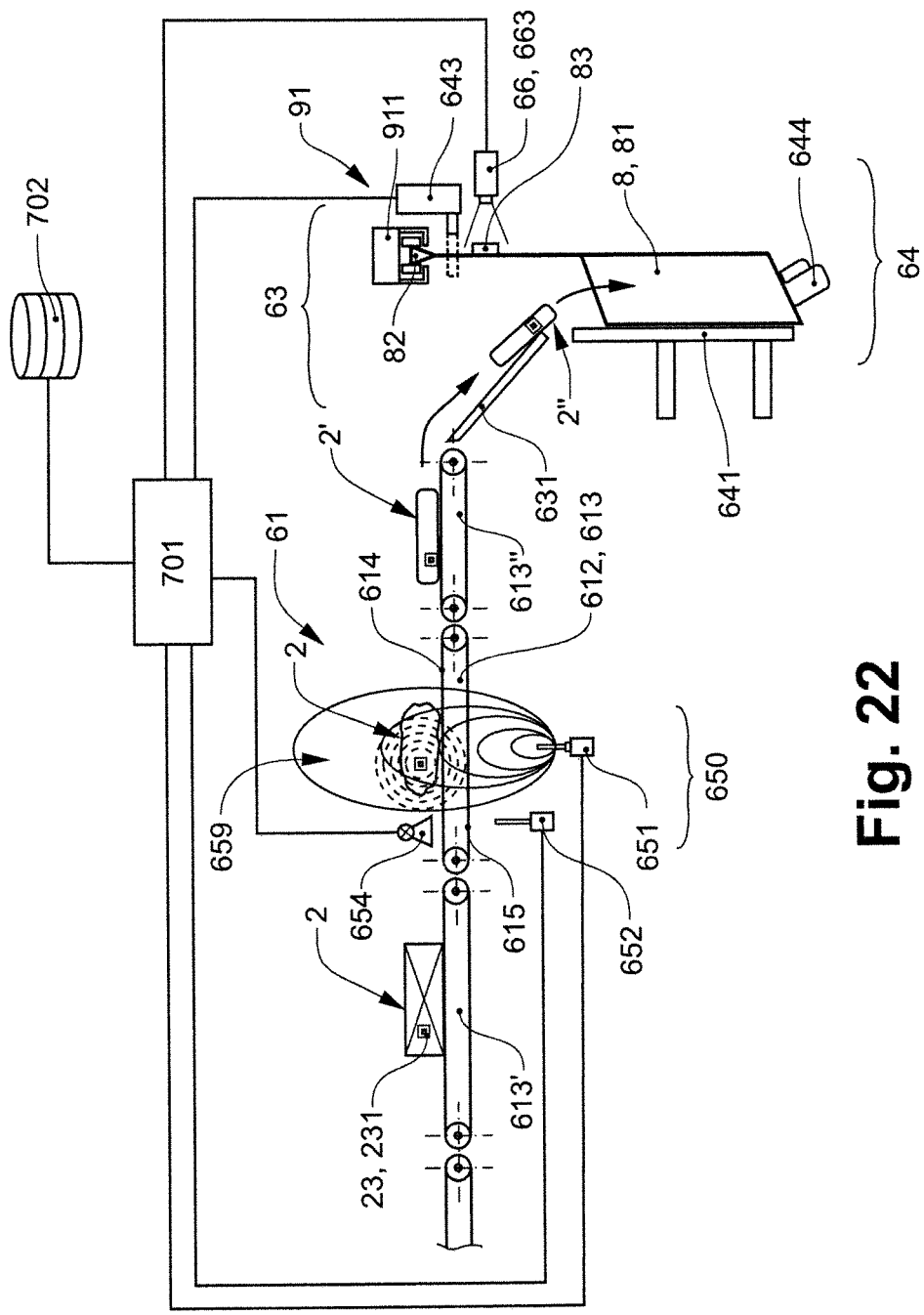
FIG. 22 shows a schematic side view of another device according to the invention for inserting goods units into a transport container, having upstream belt conveyors as buffer stores for goods units.

FIG. 22 shows a further advantageous variant of a device 6 according to the invention for inserting goods units into a transport container.

Packaging units 2 are conveyed from the left onto the belt conveyor 612 of the feed module 61. In the embodiment shown, the feed takes place via at least two horizontal conveying devices 613'. By targeted stopping and starting of these horizontal conveying devices 613', packaging units 2 can be temporarily parked, whereby a buffer storage for goods units can be realized.

A light barrier device 654 transverse to the conveying direction detects a packaging unit 2 arriving on the belt conveyor 612 of the feed module 61. Taking into account the conveying speed of the belt conveyor 612, the location of the packaging unit 2 on the belt conveyor 612 and the longitudinal extension in the conveying direction can thus be determined. This allows correct positioning of the packaging unit 2 at the identification position 659 of the first identification module 65. The RFID reader unit 650 is arranged below the belt conveyor 612.

The various subunits and modules of the device 6 are controlled by a control unit 701 and transmit data to the control device 701. The control device 701 has a database 702 on which, for example, the logical links between transport containers and goods units can be stored.

Figure 23:
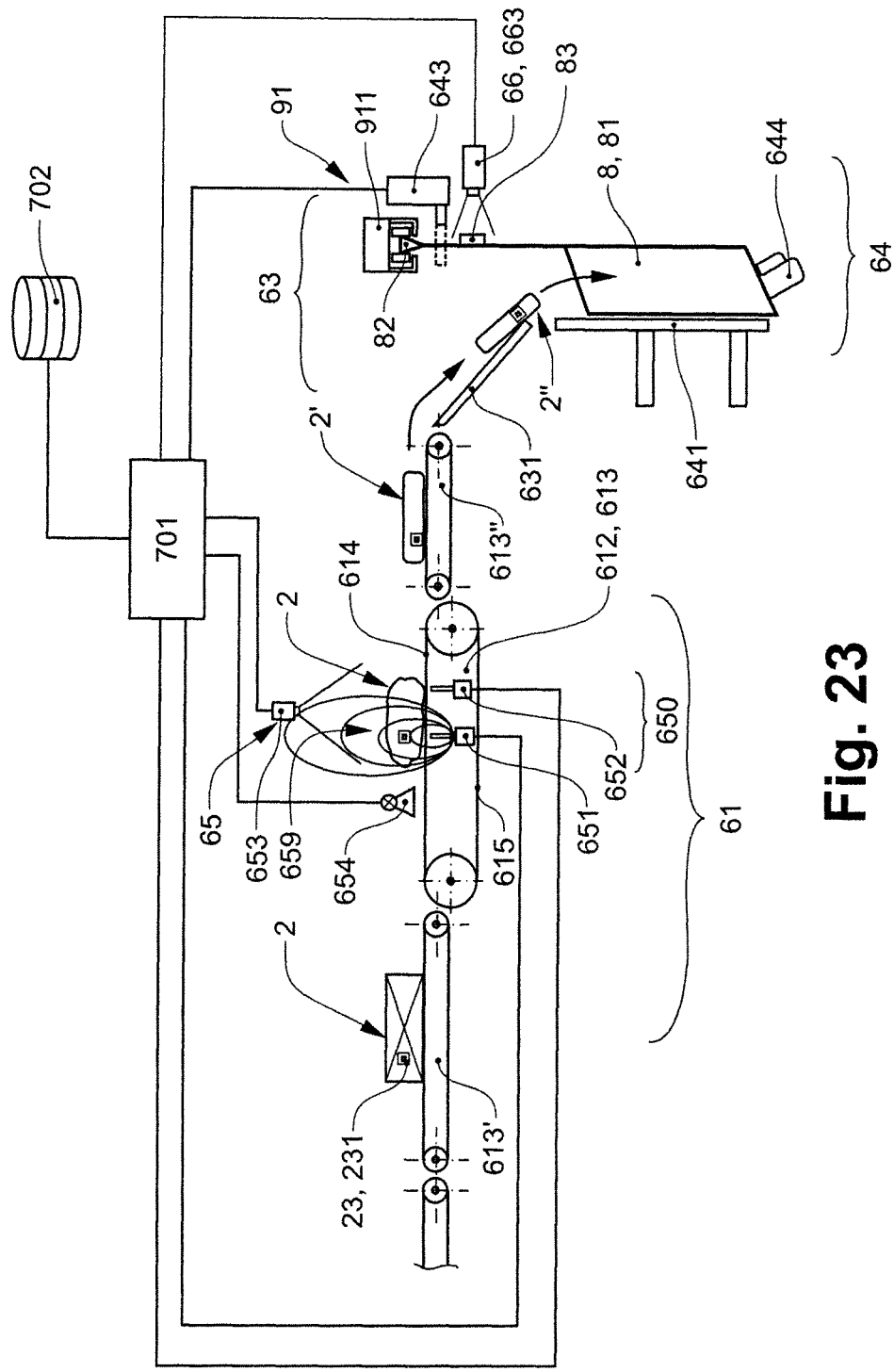
FIG. 23 shows a schematic side view of a device according to the invention for inserting goods units into a transport container, an RFID reader unit, and an optical reader unit.

The device 6 shown in FIG. 23 corresponds in part to the device of FIG. 22. The belt conveyor 612 has a greater vertical distance between the lower belt plane 615 and the upper belt plane 614 than the other horizontal conveying devices 613', 613". This makes it possible to arrange the RF transmitter 651 and the RF receiver 652 of the RFID reader unit 650 between the two belt planes 614, 615, close to the upper belt plane 614 on which the packaging unit 2 rests.

The first identification module 65 further has an optical reader unit 653 having a camera. This combination of RFID reader unit 650 and optical reader unit 653 allows processing of packaging units with different types of data elements 23.

Figure 24:
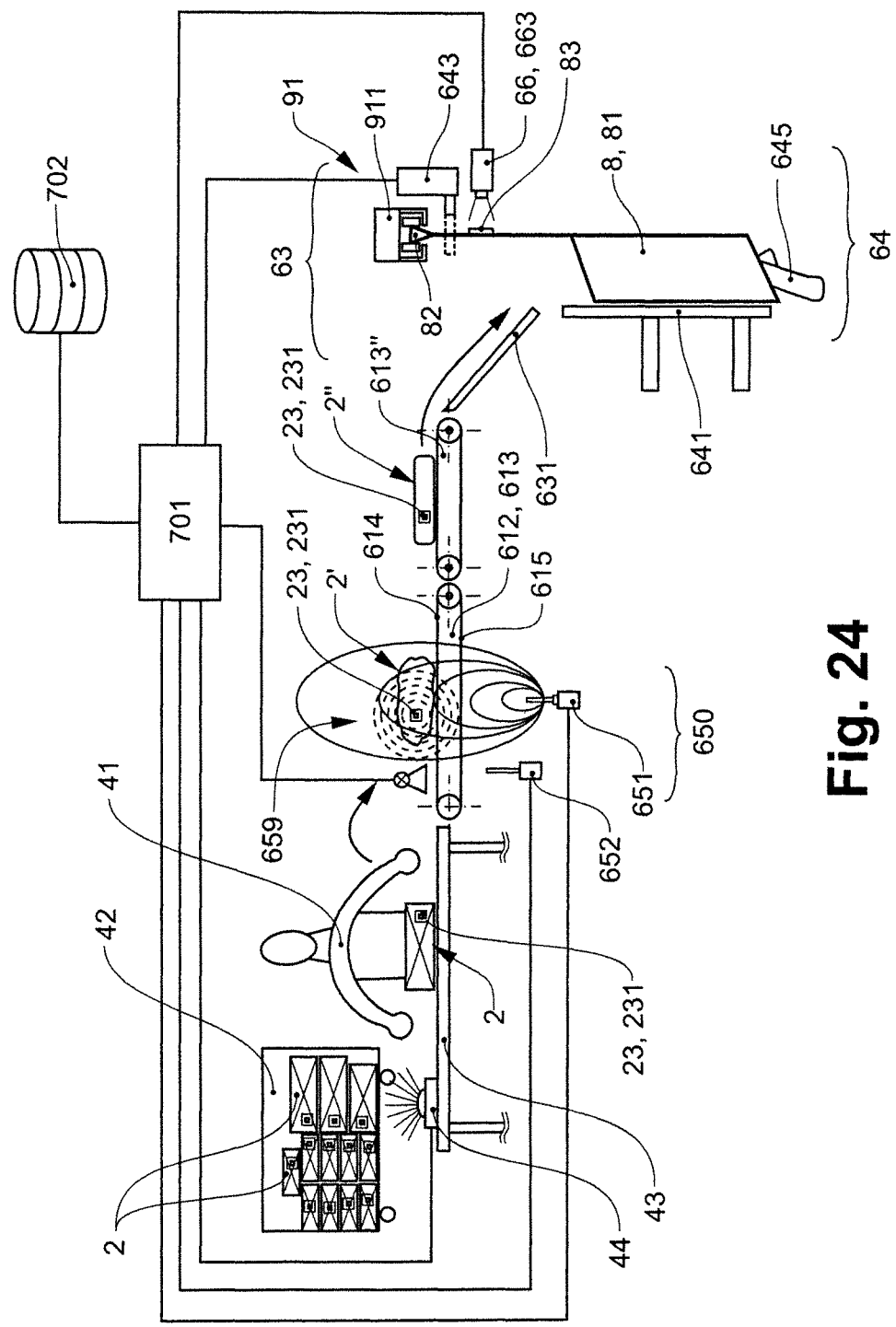
FIG. 24 shows a schematic side view of a device according to the invention for inserting goods units into a transport container, having manual loading of the device.

An embodiment of a device 6 according to the invention that can be loaded manually with packaging units 2 is shown in FIG. 24. An operator 41 removes a packaging unit 2 from a trolley having provided packaging units 42 and deposits it on a work table 43. The work table 43 can be, for example, a roller track table or a ball roller table.

A signal light 44 connected to the control unit 701 indicates to the operator 41 that they are to transfer the packaging unit 2 to the adjacent feed module 61, for example by a green light. If the feed module is occupied by a packaging unit 2, this can be indicated to the operator 41 for example by a yellow light of the signal light 44. If an error occurs, for example because the identification of the packaging unit 2' has failed, this can be indicated to the operator 41 by a red light of the signal lamp 44. The user 41 can then remove the corresponding packaging unit 2 from the feed module 61.

The tasks of the user 41 can optionally also be completed by a robot unit.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

Additionally, various references are cited throughout the specification, the disclosures of which are each incorporated herein by reference in their entirety.

What is claimed is:

1. A device for inserting flat good units into a transport container comprising:
   an insertion module for inserting flat good units into a transport container;
   a feed module for feeding flat good units to the insertion module by supplying a bundle with a carrier strand, on which a plurality of packaging units are arranged one behind the other in a row;
   a separation module for providing flat good units by separating package elements from a supplied bundle; and
   a first identification module for identifying flat good units;
   wherein the feed module comprises a horizontal conveying device by which flat good units are conveyable along a conveying path; and
   wherein the first identification module is configured to determine the identity of a flat good unit.

2. The device according to claim 1, wherein the first identification module is configured to determine the identity of a flat good unit when said flat good unit is located on the horizontal conveying device at an identification position.

3. The device according to claim 1, wherein the first identification module comprises an optical reader unit and/or an RFID reader unit.

4. The device according to claim 3, wherein an RFID reader unit of the first identification module is arranged below the feed module.

5. The device according to claim 4, wherein the feed module comprises a belt conveyor having an upper belt plane and a lower belt plane, and wherein an RF transmitter and/or an RF receiver of an RFID reader unit of the first identification module is arranged between the upper belt plane and the lower belt plane of the belt conveyor.

6. The device according to claim 1, wherein the first identification module comprises a light barrier device for determining the presence or position of a flat good unit, on the feed module.

7. The device according to claim 1 further comprising a control device connected to a database, wherein the control device is configured to logically link, in the database, the identity of a transport container and the identity of the flat good unit inserted therein.

8. The device according to claim 1, having a module for providing transport containers.

9. The device according to claim 8, wherein the module for providing transport containers has a second identification module for identifying transport containers.

10. The device according to claim 9, wherein the second identification module comprises an optical detector unit and/or an RFID reader unit.

11. The device according to claim 8, wherein the module for providing transport containers is configured to receive a transport container from a conveyor system and/or to transfer a transport container to a conveyor system.

12. The device according to claim 8, wherein the module for providing transport containers is configured to transfer a transport container in the form of an overhead conveyor bag from a closed state into an open state.

13. The device according to claim 8, wherein the module for providing transport containers is designed to align a transport container in the form of an overhead conveyor bag of an overhead conveyor system before a goods unit is inserted.

14. The device according to claim 13, wherein the module for providing transport containers is configured to rotate the overhead conveyor bag from a conveying position into a filling position before the goods unit is inserted.

15. The device according to claim 1, wherein the device is integrated into a conveyor system of an intralogistics system.

16. A method for inserting flat good units into a transport container with the device of claim 1, the method comprising:
- providing the flat good unit on the feed module;
- providing the transport container;
- identifying the flat good unit;
- identifying the transport container; and
- inserting the flat good unit into the transport container.

17. The method according to claim 16, wherein the identity of the flat good unit and the identity of the transport container are logically linked to each other.

* * * * *